US012756701B2

(12) United States Patent
Lu

(10) Patent No.: US 12,756,701 B2
(45) Date of Patent: Oct. 6, 2026

(54) RELAY COMMUNICATION METHODS AND APPARATUSES, COMMUNICATION DEVICE, AND STORAGE MEDIUM

(71) Applicant: Beijing Xiaomi Mobile Software Co., Ltd., Beijing (CN)

(72) Inventor: Wei Lu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 18/852,697

(22) PCT Filed: Apr. 2, 2022

(86) PCT No.: PCT/CN2022/085183
§ 371 (c)(1),
(2) Date: Sep. 30, 2024

(87) PCT Pub. No.: WO2023/184561
PCT Pub. Date: Oct. 5, 2023

(65) Prior Publication Data

US 2025/0240285 A1 Jul. 24, 2025

(51) Int. Cl.

| | |
|---|---|
| ***H04L 9/40*** | (2022.01) |
| ***H04W 4/70*** | (2018.01) |
| ***H04W 12/0431*** | (2021.01) |
| ***H04W 12/106*** | (2021.01) |
| ***H04W 12/50*** | (2021.01) |

(Continued)

(52) U.S. Cl.
CPC ........ *H04L 63/083* (2013.01); *H04L 63/1433* (2013.01)

(58) Field of Classification Search
CPC .. H04L 63/083; H04L 63/1433; H04W 88/04; H04W 12/0431; H04W 12/106; H04W 12/50; H04W 76/14; H04W 4/70
See application file for complete search history.

(56) References Cited

U.S. PATENT DOCUMENTS 9,979,730 B2 * 5/2018 Wong .................. H04L 63/0281
10,499,236 B2 12/2019 Stojanovski et al.

(Continued)

FOREIGN PATENT DOCUMENTS

CN 107852418 A 3/2018
CN 110192381 A 8/2019

(Continued)

OTHER PUBLICATIONS

3GPP TS 23.304 v17.2.1, Release 17, Mar. 2022. (Year: 2022).*

(Continued)

*Primary Examiner* — Darren B Schwartz
(74) *Attorney, Agent, or Firm* — Finnegan, Henderson, Farabow, Garrett & Dunner, L.L.P.

(57) ABSTRACT

A relay communication method is performed by a first user equipment (UE), and includes: sending a security information request message to a first network node, wherein the security information request message is configured to request security information for protecting a relay communication discovery between the first UE and a second UE; and receiving a security information response message sent by the first network node, wherein the security information response message includes the security information.

15 Claims, 10 Drawing Sheets

(51) Int. Cl.

| | |
|---|---|
| ***H04W 76/14*** | (2018.01) |
| ***H04W 88/04*** | (2009.01) |

(56) References Cited

U.S. PATENT DOCUMENTS

| | | | | |
|---|---|---|---|---|
| 11,259,350 | B1 * | 2/2022 | Pan | H04W 88/04 |
| 2015/0029866 | A1 | 1/2015 | Liao et al. | |
| 2017/0126682 | A1 * | 5/2017 | Wong | H04W 12/069 |
| 2018/0234827 | A1 | 8/2018 | Stojanovski et al. | |
| 2019/0335332 | A1 * | 10/2019 | Ying | H04W 40/22 |
| 2020/0213858 | A1 * | 7/2020 | Yi | H04W 8/26 |
| 2021/0400746 | A1 * | 12/2021 | Kuo | H04W 80/02 |
| 2021/0400747 | A1 * | 12/2021 | Kuo | H04W 76/14 |
| 2022/0095398 | A1 * | 3/2022 | Pan | H04W 76/14 |
| 2022/0109996 | A1 * | 4/2022 | Lee | H04W 12/50 |
| 2024/0121606 | A1 * | 4/2024 | Zhou | H04L 9/3242 |
| 2024/0224355 | A1 * | 7/2024 | Lei | H04W 12/0431 |

FOREIGN PATENT DOCUMENTS

| | | | | |
|---|---|---|---|---|
| CN | 113133085 A | 7/2021 | | |
| CN | 114128396 A | 3/2022 | | |
| CN | 114257985 A | 3/2022 | | |
| EP | 3962131 A1 | 3/2022 | | |
| WO | WO 2019/051776 A1 * | 3/2019 | | H04L 29/08 |
| WO | 2021067653 A1 | 4/2021 | | |
| WO | WO 2022/019627 A1 | 1/2022 | | |

OTHER PUBLICATIONS

3GPP TS 33.303 v17.0.0, Release 17, Dec. 2021. (Year: 2021).*

3GPP TS 33.503 v0.2.0, Release 17, Nov. 2021. (Year: 2021).*

European Patent Office, Extended European Search Report issued in Application No. 229343875, May 7, 2025, Germany, 13 pages.

3GPP TR 33.847 V17.1.0 (Mar. 2022), "3rd Generatisn Partnership Projec;t Technical Specification Group Services and System Aspects; Study on security aspects of enhancement for proximity based services in the 58 System (5GS) (Release 17)", XP052144810, Mar. 24, 2022, 165 pages.

Office Action issued by the State Intellectual Property Office of the People's Republic of China, in corresponding Application No. 202280001078.8, Jan. 16, 2025, 13 pages.

ISA State Intellectual Property Office of the People's Republic of China, Written Opinion of the International Searching Authority Issued in Application No. PCT/CN2022/085183, Aug. 15, 2022, WIPO, 7 pages.

ISA State Intellectual Property Office of the People's Republic of China, International Search Report Issued in Application No. PCT/CN2022/085183, Aug. 15, 2022, WIPO, 4 pages.

3GPP. "3GPP TS 33.503 V0.3.0", Mar. 2022, 42 pages.

3GPP. "3GPP TS 23.304 V17.2.1", Mar. 2022, 103 pages.

3GPP. "3GPP TS 33.303 V17.0.0", Dec. 2021, 91 pages.

SA WG3. "Rel-17 Work Item Exception for 5G_ProSe Security Aspects", 3GPP TSG-SA3 Meeting #106-e S3-220521, 1 page.

Intellectual Property India, Office Action Issued in Application No. 202417083603, May 27, 2026, 8 pages.

* cited by examiner

RELAY COMMUNICATION METHODS AND APPARATUSES, COMMUNICATION DEVICE, AND STORAGE MEDIUM

CROSS REFERENCE TO RELATED APPLICATIONS

This application is a U.S. National Stage of International Application No. PCT/CN2022/085183, filed on Apr. 2, 2022, the disclosure of which is incorporated herein by reference in its entirety.

TECHNICAL FIELD

The present disclosure relates to, but is not limited to, the field of communications technology, and in particular, to a relay communication method and apparatus, a communication device, and a storage medium.

BACKGROUND

In relay communication, when a Remote UE cannot communicate with a network due to network signal coverage or other reasons, it can utilize a relay UE, for example, a relay function of a UE-to-Network (C2N) relay, to continue communication with the network. In a scenario, the remote UE may first transmit information that needs to be transmitted to the network to the relay UE, and then the relay UE transmits the information to the network; or the network may first transmit information that needs to be transmitted to the remote UE to the relay terminal, and then the relay UE transmits the information to the remote UE, so as to implement communications between the remote UE and the network.

SUMMARY

The embodiments of the present disclosure disclose a relay communication method and apparatus, a communication device, and a storage medium.

According to a first aspect of an embodiment of the present disclosure, there is provided a relay communication method performed by a first UE, including:

- sending a security information request message to a first network node, wherein the security information request message is configured to request security information for protecting a relay communication discovery between the first UE and a second UE;
- receiving a security information response message sent by the first network node, wherein the security information response message comprises the security information.

According to a second aspect of an embodiment of the present disclosure, there is provided a relay communication method performed by a second UE, including:

- sending a security information request message to a second network node, so that the security information request message is sent to a first network node by the second network node, wherein the security information request message is configured to request security information for protecting a relay communication discovery between a first UE and the second UE;
- receiving a security information response message sent by the second network node, wherein the security information response message is sent by the first network node and comprises the security information.

According to a third aspect of an embodiment of the present disclosure, there is provided a relay communication method performed by a first network node, comprising:

- receiving a security information request message, wherein the security information request message is configured to request security information for protecting a relay communication discovery between a first user equipment (UE) and a second UE;
- sending a security information response message, wherein the security information response message comprises the security information.

According to a fourth aspect of the embodiments of the present disclosure, there is provided a relay communication method performed by a second network node, comprising:

- sending a security information request message to a first network node, wherein the security information request message is sent by a second user equipment (UE), and the security information request message is configured to request security information for protecting a relay communication discovery between a first UE and the second UE;
- sending a security information response message to the second UE, wherein the security information response message is sent by the first network node and comprises the security information.

According to a fifth aspect of an embodiment of the present disclosure, there is provided a relay communication apparatus, applied to a first UE, including:

- a first sending module configured to send a security information request message to a first network node, wherein the security information request message is configured to request security information for protecting relay communication discovery between the first UE and a second UE;
- a first receiving module configured to receive a security information response message sent by the first network node, wherein the security information response message comprises the security information.

According to a sixth aspect of an embodiment of the present disclosure, there is provided a relay communication apparatus applied to a second UE, including:

- a second sending module, configured to send a security information request message to a second network node, so that the security information request message is sent to a first network node by the second network node, wherein the security information request message is configured to request security information for protecting a relay communication discovery between a first UE and the second UE;
- a second receiving module, configured to receive a security information response message sent by the second network node, wherein the security information response message is sent by the first network node and comprises the security information.

According to the seventh aspect of the embodiment of the present disclosure, there is provided a relay communication apparatus, applied to a first network node, comprising:

- a third receiving module, configured to receive a security information request message, wherein the security information request message is configured to request security information for protecting a relay communication discovery between s first user equipment (UE) and a second UE;
- a third sending module, configured to send a security information response message, wherein the security information response message comprises the security information.

According to the eighth aspect of the embodiment of the present disclosure, there is provided a relay communication apparatus applied to a second network node, comprising:

a fourth sending module, configured to send a security information request message to a first network node, wherein the security information request message is sent by a second user equipment (UE), and the security information request message is configured to request security information for protecting a relay communication discovery between a first UE and the second UE;

wherein the fourth sending module is configured to send a security information response message to the second UE, wherein the security information response message is sent by the first network node and comprises the security information.

According to a ninth aspect of the present disclosure, there is provided a communication device, comprising:

a processor;

a memory for storing instructions executable by the processor;

wherein the processor is configured to perform the relay communication method of any of the embodiments of the present disclosure when executing the executable instructions.

According to a tenth aspect of the present disclosure, there is provided a computer storage medium storing a computer executable program that, when executed by a processor, implements the relay communication method of any of the embodiments of the present disclosure.

It is to be understood that the foregoing general description and the following detailed description are exemplary and explanatory only and can not limit of the embodiments of the present disclosure.

DETAILED DESCRIPTION

Reference will now be made in detail to exemplary embodiments, examples of which are illustrated in the accompanying drawings. When the following description relates to the accompanying drawings, the same numbers in different drawings indicate the same or similar elements, unless otherwise indicated. The implementations described in the following exemplary embodiments are not intended to be all that are consistent with the embodiments of the disclosure. Rather, they are merely examples of apparatus and methods consistent with some aspects of the disclosed embodiments as detailed in the appended claims.

The terms used in the embodiments of the disclosure are for the purpose of describing particular embodiments only and are not intended to limit of the embodiments of the disclosure. As used in the embodiments of the present disclosure and the append claims, the singular forms “a”, “an”, and “the” are intended to include the plural form as well, unless the context clearly dictates otherwise. It should also be understood that the term “and/or” as used herein refers to and encompasses any and all possible combinations of one or more of the associated listed items.

It should be understood that although the terms first, second, third, etc. may be employed in embodiments of the present disclosure to describe various information, the information should not be limited to these terms. These terms are used only to distinguish one type of information from another. For example, the first information may also be referred to as the second information, and similarly, the second information may also be referred to as the first information, without departing from the scope of the embodiments of the present disclosure. Depending on the context, the word “if” as used herein may be interpreted as “when . . . ” or “while . . . ” or “in response to determining”.

In the related art, in the process of relay communication discovery, the information transmitted between the remote UE and the relay UE lacks security protection, for example, discovery information transmitted between the remote UE and the relay UE lacks security protection, so there is a great security risk.

Figure 1:
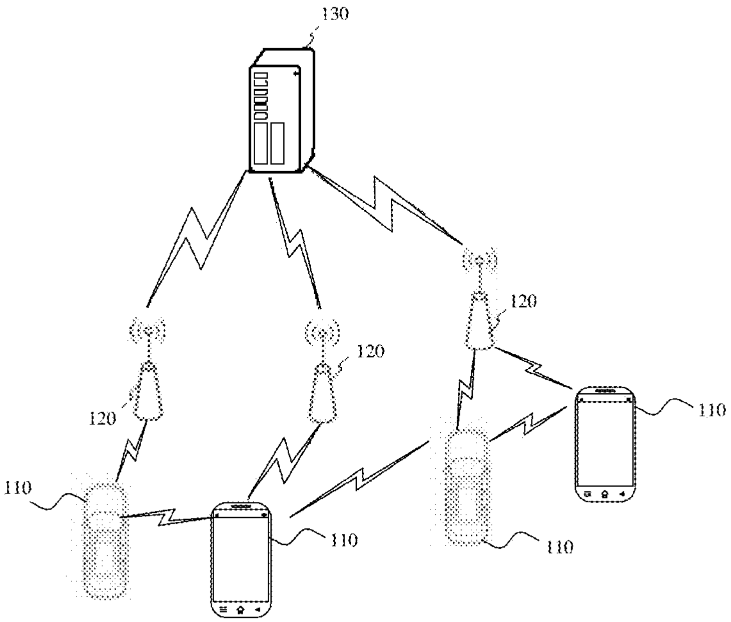
FIG. 1 is a schematic structural diagram of a wireless communication system according to an exemplary embodiment.

Referring to FIG. 1, it is a schematic structural diagram of a wireless communication system according to an embodiment of the present disclosure. As shown in FIG. 1, the wireless communication system is a communication system based on the cellular mobile communication technology, and the wireless communication system may include a plurality of user equipment 110 and a plurality of base stations 120.

A user equipment 110 may refer to a device that provides voice and/or data connectivity to a user. The user equipment 110 may communicate with one or more core networks via a Radio Access Network (RAN), and may be IoT user equipment such as a sensor device, a mobile phone (or referred to as “cellular” phone), and a computer with IoT user equipment, which may be a device such as a fixed, portable, pocket-sized, handheld, computer embedded, or vehicle mounted device. E.g., a station (STA), a subscriber unit, a subscriber station, a mobile station, a mobile, a remote station, an access point, a remote terminal, an access terminal, a user terminal, a user agent, a user device, or a user equipment. In some examples, the user device 110 may be a device of an unmanned aerial vehicle. In some examples, the user device 110 may also be a vehicle-mounted device, for example, vehicle computer with wireless communication functions, or a wireless user equipment externally connected to the vehicle computer. In some examples, the user equipment 110 may also be a roadside device, such as a street lamp, a signal lamp, or other roadside devices with wireless communication functions.

The base station 120 may be a network-side device in a wireless communication system. Wherein the wireless communication system may be the 4th generation mobile communication (4G) system, also called Long Term Evolution (LTE) system; in some examples, the wireless communication system may also be a 5G system, which is also called a new radio system or a 5G NR system. In some examples, the wireless communication system may be the next generation system of the 5G system. Wherein the access network in the 5G system may be referred to as a New Generation-Radio Access Network (NG-RAN).

Wherein the base station 120 may be an evolved base station (eNB) employed in a 4G system. In some examples, the base station 120 may also be a base station (gNB) adopting a centralized distributed architecture in a 5G system. When the base station 120 employs a centralized-distributed architecture, it generally includes a central unit (CU) and at least two distributed units (DUs). The central unit is provided with a protocol stack of a Packet Data Convergence Protocol (PDCP) layer, a Radio Link Control (RLC) layer, and a Medium Access Control (MAC) layer. The distribution unit is provided with a protocol stack of a Physical (PHY) layer. The embodiments of the present disclosure do not limit the specific implementation of the base station 120.

A wireless connection may be established between the base station 120 and the user equipment 110 through a wireless air interface. In different embodiments, the wireless air interface is a wireless air interface based on the fourth generation mobile communication network technology (4G) standard, or the wireless air interface is a wireless air interface based on the fifth generation mobile communication network technology (5G) standard, for example, the wireless air interface is a new radio; Or, the wireless air interface may also be a wireless air interface based on a next generation mobile communication network technology standard of 5G.

In some embodiments, an E2E (End to End) connection may further be established between different user equipment 110, for example, in scenarios such as vehicle to vehicle (V2V) communication, vehicle to Infrastructure (V2I) communication and vehicle to pedestrian (V2P) communication in vehicle to everything (V2X).

Here, the user equipment described above may be considered as a terminal device of the following embodiments.

In some embodiments, the wireless communication system described above may further include a network management device 130.

A plurality of base stations 120 are respectively connected to the network management device 130. The network management device 130 may be a core network device in the wireless communication system. For example, the network management device 130 may be a mobility management entity (MME) in an Evolved Packet Core (EPC). Or, the network management device may further be other core network devices, such as a serving gateway (SGW), a public data network gateway (PGW), a policy and charging rules function (PCRF), or a home subscriber server (HSS), etc. The implementation form of the network management device 130 is not limited in the embodiments of the present disclosure.

In order to facilitate the understanding of those skilled in the art, the embodiments of the present disclosure enumerate a plurality of implementations to clearly explain the technical solutions of the embodiments of the present disclosure. Of course, those skilled in the art can understand that the plurality of embodiments provided in the embodiments of the present disclosure can be executed independently, and can be executed together with the methods of other embodiments in the embodiments of the present disclosure, and can also be executed together with some methods in other related technologies independently or in combination, which is not limited by the embodiments of this disclosure.

In order to better understand the technical solution described in any of the embodiments of the present disclosure, first, relay communication in the related art is partially described:

In an embodiment, solutions on a control plane and a user plane are provided for UE-to-Network relay. For the solution based on the user plane, a 5G Proximity-based Service (ProSe) key management function (PKMF) is used for supporting security key management for PC5 connection of 5G ProSe indirect/relay communication. In LTE, in order to ensure the security of LTE ProSe, PKMF is introduced for the security key management for ProSe indirect/relay communication, and a reference point PC8 depending on the user plane of the core network is used to transmit security parameters to the terminal.

In an embodiment, a current protocol has specified how PKMF supports to generate and provision the security parameters for UE-to-relay discovery in a case of one-to-many public security, which but may not be well applied to UE-to-Network relay discovery in 5G one-to-one commercial cases. The current protocol does not specify details on their support for protecting UE-to-Network relay discovery security.

Figure 2:
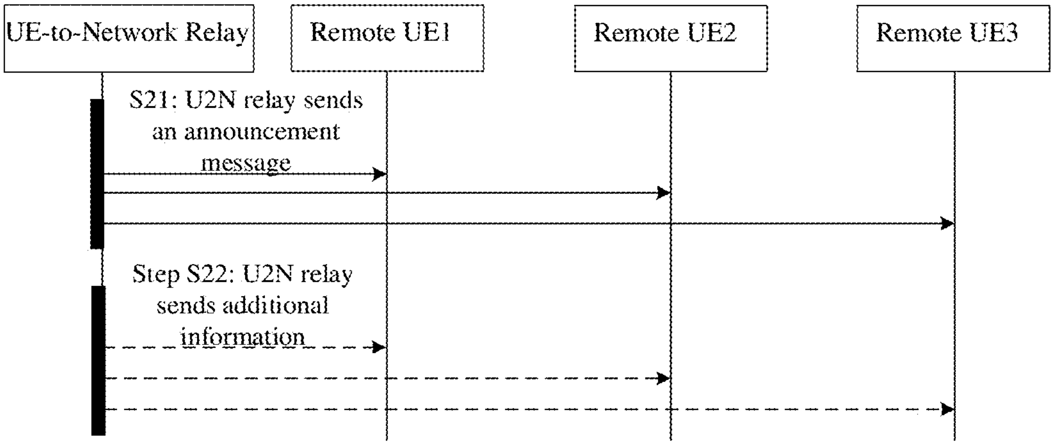
FIG. 2 is a flowchart illustrating a UE-to-network relay discovery method through Model A according to an exemplary embodiment.

In an embodiment, a Model A procedure is provided for supporting UE-to-Network relay discovery; Model A uses a single discovery protocol message (e.g., an announcement message). As shown in FIG. 2, the procedure of the model A is executed by a communication device, and the communication device includes remote UEs and a U2N relay, where the remote UEs include a remote UE1, a remote UE2 and a remote UE3; the method for UE-to-Network relay discovery through the model A includes the following steps.

In step S21, the U2N relay sends an announcement message. Here, the U2N relay sends the announcement message, and the remote UE1, the remote UE2, and the remote UE3 may all monitor the announcement message.

In some examples, in step S22, the U2N relay sends additional information. Here, the U2N relay sends the additional information, and remote UE1, remote UE2, and remote UE3 may all monitor the additional information.

Figure 3:
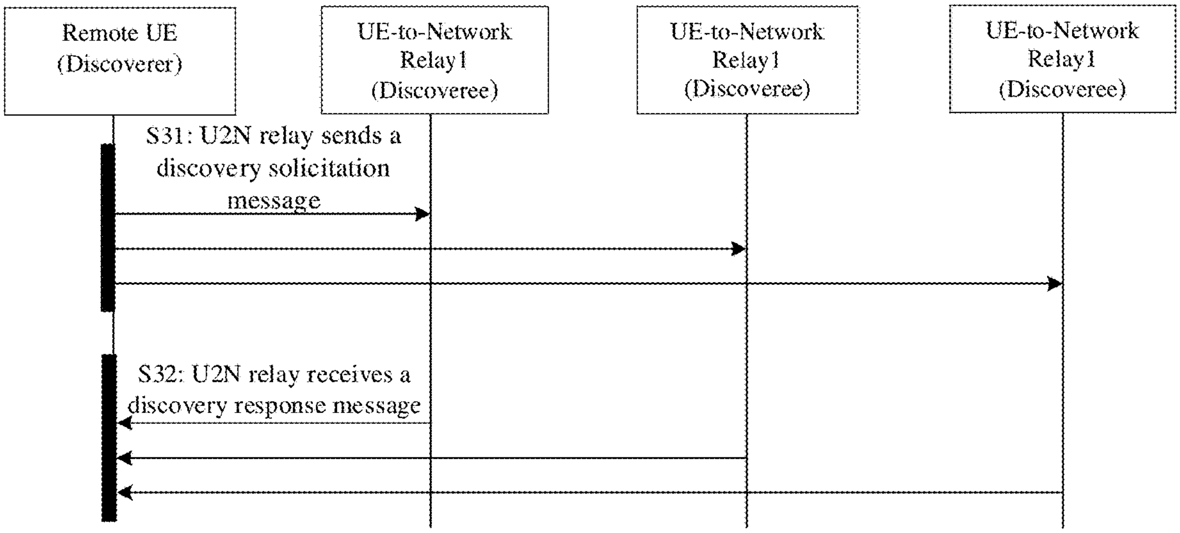
FIG. 3 is a flowchart illustrating a UE-to-network relay discovery method through Model B according to an exemplary embodiment.

In another embodiment, a Model B procedure is provided for supporting UE-to-Network relay discovery. Model B uses two discovery protocol messages (e.g., a solicitation and a response). As shown in FIG. 3, the procedure of model B is executed by a communication device, and the communication device includes remote UEs and a U2N relay, where the remote UEs include a remote UE1, a remote UE2 and a remote UE3; and the method for UE-to-Network relay discovery through the model B includes the following steps.

In step S31, the U2N relay sends a discovery solicitation message.

Here, the U2N relay sends the discovery solicitation message, and the remote UE1, the remote UE2, and the remote UE3 may all monitor the discovery solicitation message.

In step S32, the U2N relay receives a discovery response message.

Here, the remote UE1, UE2, and UE3 may all determine a discovery response message based on the discovery solicitation message and send the discovery response message; and the U2N relay may monitor the discovery response messages sent by the UE1, UE2, and/or UE3.

Figure 4:
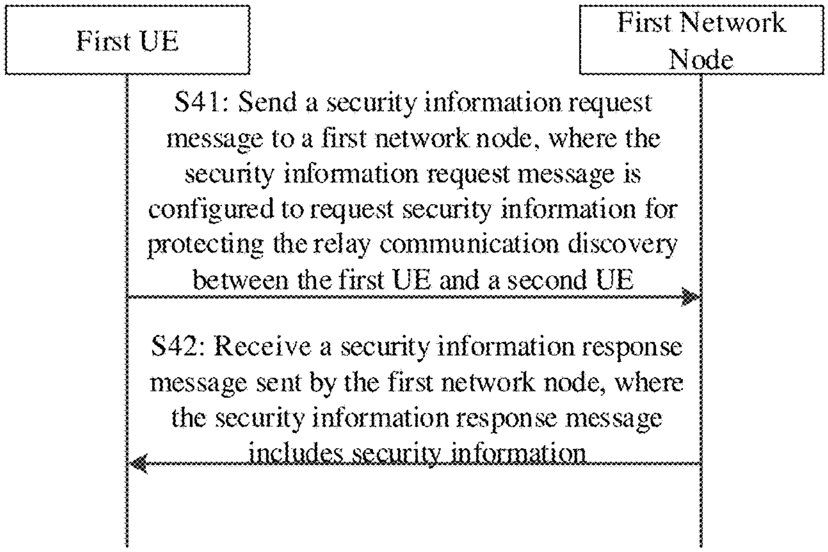
FIG. 4 is a flowchart illustrating a relay communication method according to an exemplary embodiment.

As shown in FIG. 4, an embodiment of the present disclosure provides a relay communication method, which is executed by a first UE and includes the following steps.

In step S41, a security information request message is sent to a first network node, where the security information request message is configured to request security information for protecting the relay communication discovery between the first UE and a second UE;

In step S42, a security information response message sent by the first network node is received, where the security information response message includes security information.

In the embodiments of the present disclosure, the UEs involved may be, but not limited to, mobile terminals or fixed terminals; for example, the first UE and the second UE in the following embodiments may be, but not limited to, a mobile phone, a computer, a server, a wearable device, a game console or a multimedia device. In an embodiment, the first UE may be a relay UE and the second UE may be a remote UE. Here, the relay UE may be a 5G relay UE or a 6G relay UE, etc. Here, the relaying UE may be a U2N relay.

In the embodiments of the present disclosure, the involved network nodes may be, but not limited to, core network devices or core network elements. For example, the first network node may be a PKMF, and a second network node in the following embodiments may also be a PKMF. In an embodiment, the first network node may be a PKMF in which the first UE is located, and the second network node may be a PKMF in which the second UE is located. For example, if the first UE is a U2N relay and the second UE is a remote UE, the first network node is a PKMF where the U2N relay is located, and the second network node is a PKMF where the remote UE is located.

In some embodiments, the security information request message includes a key request message. The security information response message includes a key response message. And the security information includes a discovery intermediate key.

An embodiment of the present disclosure provides a relay communication method, executed by a first UE, including:

sending a key request message to a first network node, where the key request message is used for requesting a discovery intermediate key for protecting a relay communication discovery between the first UE and a second UE;

receiving a key response message sent by the first network node, where the key response message includes the discovery intermediate key.

In an embodiment, the key request message includes a relay key request message; and the key response message includes a relay key response message.

In other embodiments, the security information may be any kind of security protection information for protecting relay communication discovery between the first UE and the second UE.

In the embodiments of the present disclosure, a security information request message may be sent to a first network node by a first UE, where the security information request message is used to request security information for relay communication discovery between the first UE and a second UE, and a security information response message sent by the first network node is received, where the security information response message includes the security information. In this way, when the first UE and the second UE perform relay communication discovery, the security information can be used for security protection of the relay communication discovery. Compared with a procedure in which relay communication discovery is performed without security protection, the relay communication discovery between the first UE and the second UE can be made more secure, and further, the communications between the first UE and the network can also be made more secure.

For example, a request for a discovery intermediate key for protecting relay communication discovery between the first UE and the second UE may be sent by the first UE to the first network node, and a key response message including the discovery intermediate key and returned by the first network node is received. Therefore, when the first UE sends information to the second UE, the information may subject to encryption or integrity protection through the discovery intermediate key, or when the first UE receives information sent by the second UE, the information may subject to decryption and integrity verification through the discovery intermediate key. Therefore, the security of relay communication discovery between the first UE and the second UE can be improved.

In an embodiment, the key request message includes Relay Service Code (RSC) which indicates a relay service;

the key response message includes a discovery intermediate key for the RSC, or a discovery intermediate key for the RSC and identification information of the discovery intermediate key.

Here, different RSCs correspond to different discovery intermediate keys. For example, one RSC indicates a relay service, one relay service corresponds to a discovery intermediate key.

In an example, if the key response message received by the first UE includes a discovery intermediate key for an RSC, the discovery intermediate key for a relay service indicated by the RSC and performed between the first UE and the second UE is determined. In this way, when the first UE requests a discovery intermediate key for only one RSC, the discovery intermediate key can be obtained through its received discovery intermediate key.

In some examples, if the key response message received by the first UE includes the discovery intermediate keys indicated by two or more RSCs and the identification information of the discovery intermediate keys, the discovery intermediate key corresponding to any one of the RSCs may be determined through the identification information of the discovery intermediate key. In this way, when the first UE requests discovery intermediate keys for a plurality of RSCs, the discovery intermediate key corresponding to any one of the RSCs can be accurately determined by obtaining the discovery intermediate keys of the plurality of RSCs and the identification information of the discovery intermediate keys. In some embodiments of the present disclosure, the plurality is two or more.

In some embodiments, the key request message includes, but is not limited to, at least one of the following:

type indication information, configured to indicate the discovery message type of the relay communication;

first security indication information, configured to indicate the security capability of the first UE.

Here, the discovery message type includes, but is not limited to, a direct discovery, or a relay discovery. In an example, the type indication information includes first type indication information, for indicating that the discovery message type is a direct discovery; second type indication information, for indicating that the discovery message type is a relay discovery.

Here, the first security indication information is configured to determine an encryption algorithm and an integrity protection algorithm by the first network node.

Thus, in the embodiments of the present disclosure, by sending the key request message including the type indication information and/or the first security indication information, etc., the first network node may determine the discovery message type and/or determine the encryption algorithm and the integrity protection algorithm, etc. of the discovery message.

In some embodiments, the key response message includes, but is not limited to, at least one of the following:

encryption algorithm information, configured to indicate an algorithm for encrypting and decrypting the discovery message of the relay communication;

integrity protection algorithm information, configured to indicate an algorithm for performing integrity protection on the discovery message of the relay communication;

time-related information, configured to determine whether the discovery message of the relay communication is subject to replay attacks.

In some embodiments, the encryption algorithm information includes a first algorithm identification; and the integrity protection algorithm information includes a second algorithm identification.

In some embodiments, the key response message includes an algorithm identification, where the algorithm identification includes a first algorithm identification indicating encryption algorithm information and/or a second algorithm identification indicating integrity protection algorithm information.

In some other embodiments, the key response message includes an algorithm identification including at least one of:

a first algorithm identification, configured to indicate an algorithm for encrypting and decrypting the discovery message of the relay communication;

a second algorithm identification, configured to indicate an algorithm for performing integrity protection on the discovery message of the relay communication.

Here, that time-related information includes, but is not limited to, at least one of: a current time, a maximum offset, and a validity timer.

Here, the first UE may determine whether a received information (e.g., an announcement message) is subject to replay attacks base on the current time and the validity timer. For example, the first UE receives a discovery solicitation message of the second UE; if the first UE determines that the current time is not within the set time of the validity timer, it can be determined that the discovery solicitation message is subject to replay attacks; or if he first UE determines that the current time is within the set time of the validity timer, it can be determined that the discovery message is not subject to replay attacks. Or, the first UE determines a first time range based on the current time and the maximum offset and/or based on a difference between the current time and the maximum offset. If the first time range is not within the set time of the validity timer, it can be determined that the discovery message is subject to replay attacks, or if the first time range is within the set time of the validity timer, it can be determined that the discovery message is not subject to replay attacks.

Thus, in the embodiments of the present disclosure, the key response message including one of the encryption algorithm information, the first algorithm identification, the integrity protection algorithm information, the second algorithm identification, and the time-related information sent by the first network node may be received, so that the first UE may obtain an encryption algorithm for encrypting or decrypting the discovery message, an integrity protection algorithm, and/or time-related information for determining whether the discovery message is subject to replay attacks, thereby further improving the security of the relay communication discovery between the first UE and the second UE.

An embodiment of the present disclosure provides a relay communication method, executed by a first UE, including:

obtaining first address information of a first network node;

sending a security information request message to the first network node based on the first address information.

In some embodiments, the sending the security information request message to the first network node in step S41 includes sending the security information request message to the first network node based on the first address information.

In some embodiments, the obtaining the first address information of the first network node includes obtaining the first address information of the first network node from a Policy Control Function (PCF) or a Direct Discovery Name Management Function (DDNMF).

An embodiment of the present disclosure provides a relay communication method, which is executed by a first UE, and includes: obtaining first address information of a first network node from a PCF or a DDNMF.

Here, the PCF or the DDNMF is a PCF or a DDNMF corresponding to the first UE.

An embodiment of the present disclosure provides a relay communication method, which is executed by a first UE, and includes: obtaining a first RSC set, where the first RSC set includes: at least one first RSC, where the first RSC is an RSC of a relay service that can be provided by the first UE.

In some embodiments, the obtaining the first RSC set includes obtaining the first RSC set from the PCF.

An embodiment of the present disclosure provides a relay communication method, which is executed by a first UE, and includes: obtaining a first RSC set from a PCF.

Here, the first RSC set may be discovery parameters.

In the embodiment of the present disclosure, the first UE may obtain the first address information of the first network node from a core network element such as a PCF or a DDNMF, so as to determine to which first network node the key request message is sent based on the first address information.

In the embodiments of the present disclosure, the relay service RSC that can be provided by the first UE may be obtained by the first UE from a core network element such as a PCF, so that it may be known that the first UE can provide the relay service.

It should be noted that, those skilled in the art can understand that the method provided in the embodiments of the present disclosure can be performed alone or together with some methods in the embodiments of the present disclosure or some methods in related art.

Figure 5:
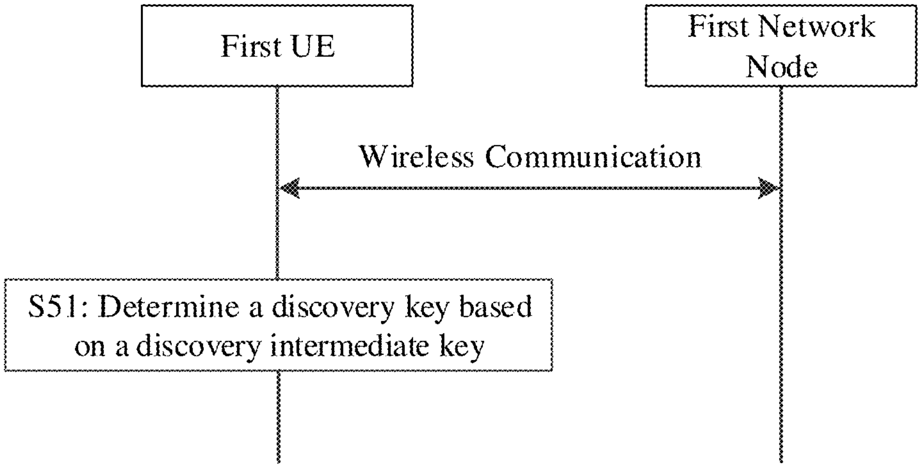
FIG. 5 is a flowchart illustrating a relay communication method according to an exemplary embodiment.

As shown in FIG. 5, an embodiment of the present disclosure provides a relay communication method, which is executed by a first UE and includes the following steps.

In step S51, a discovery key is determined based on a discovery intermediate key;

the discovery key comprises at least one of: an encryption key (DUCK), for encrypting and decrypting the discovery message of the relay communication; an integrity assurance key (DUIK), for protecting the integrity of the discovery message of the relay communication.

In some embodiments, the determining the discovery key based on the discovery intermediate key includes one of:

determining a discovery key based on the discovery intermediate key and an algorithm identification;

determining a discovery key based on the discovery intermediate key, the algorithm identification, and an RSC.

In the embodiments of the present disclosure, the algorithm identification may include the first algorithm identification and/or the second algorithm identification in the foregoing embodiments; the RSC may be the RSC in the foregoing embodiments; and the discovery intermediate key may be the discovery intermediate key in the foregoing embodiments.

An embodiment of the present disclosure provides a relay communication method, which is executed by a first UE, and includes: determining a discovery key based on a discovery intermediate key and an algorithm identification.

An embodiment of the present disclosure provides a relay communication method, which is executed by a first UE, and includes: determining a discovery key based on a discovery intermediate key, an algorithm identification, and an RSC.

As such, in an embodiment of the present disclosure, by adding an RSC to the input parameters when determining the discovery key, the discovery key obtained may be bound for a particular relay service.

It should be noted that, those skilled in the art can understand that the method provided in the embodiments of the present disclosure can be performed alone or together with some methods in the embodiments of the present disclosure or some methods in related art.

Figure 6:
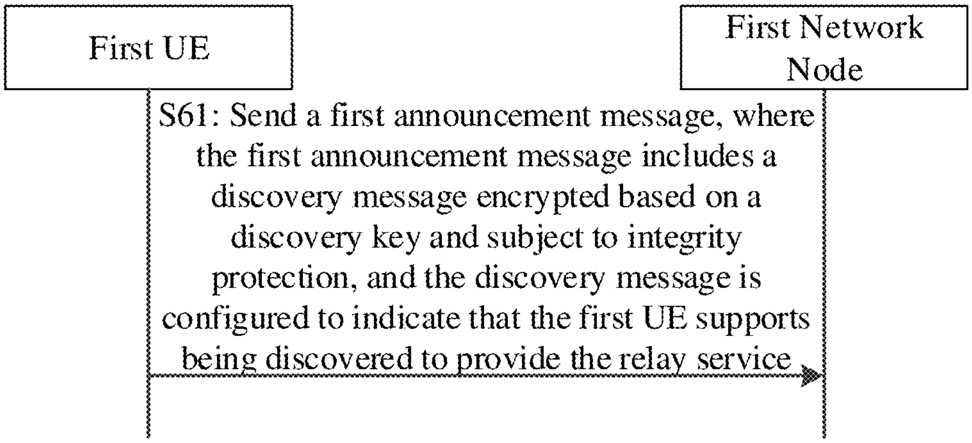
FIG. 6 is a flowchart illustrating a relay communication method according to an exemplary embodiment.

As shown in FIG. 6, an embodiment of the present disclosure provides a relay communication method, which is executed by a first UE and includes the following steps.

In step S61, a first announcement message is sent, where the first announcement message includes a discovery message encrypted based on a discovery key and subject to integrity protection, and the discovery message is configured to indicate that the first UE supports to be discovered to provide the relay service.

Here, the discovery message included in the first announcement message may be a discovery message encrypted based on a discovery key and an encryption algorithm and integrity-protected based on an integrity protection algorithm.

The sending of the first announcement message in step S61 may be broadcasting the first announcement message.

In an embodiment, the discovery message includes an RSC. Thus, the first UE can inform a second UE and the like that the first UE supports the relay service indicated by the RSC.

In another embodiment, the discovery message includes, but is not limited to, the RSC and the identification information of the first UE. Thus, the first UE can inform the second UE, etc. which first UE supports the relay service indicated by the RSC.

In this way, in the embodiments of the present disclosure, by broadcasting a first announcement message, the second UE that monitors the first announcement message may know the relay service that the first UE can provide. And the discovery message in the first announcement message is a discovery message encrypted by a discovery key and subject to integrity protection, so that the security of relay communication discovery between the first UE and the second UE can be improved.

Figure 7:
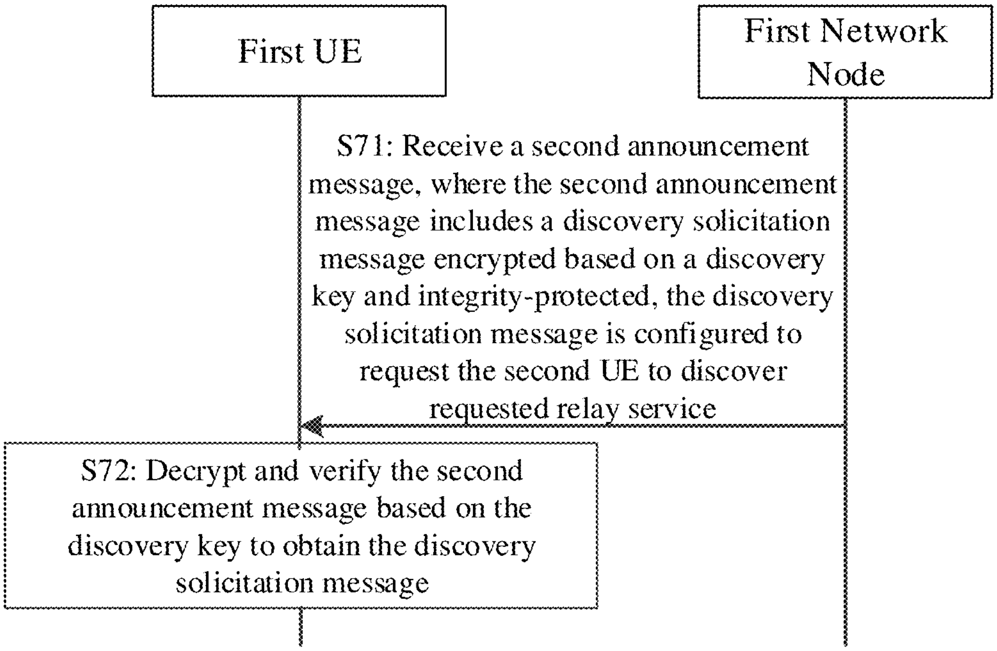
FIG. 7 is a flowchart illustrating a relay communication method according to an exemplary embodiment.

As shown in FIG. 7, an embodiment of the present disclosure provides a relay communication method, which is executed by a first UE and includes the following steps.

In step S71, a second announcement message is received, where the second announcement message includes a discovery solicitation message encrypted based on a discovery key and subject to integrity protection, and the discovery solicitation message is configured to request the second UE to discover a requested relay service.

In step S72, the second announcement message is decrypted and verified based on the discovery key to obtain the discovery solicitation message.

Here, the discovery solicitation message in the second announcement message may be a discovery solicitation message encrypted based on the discovery key and an encryption algorithm and integrity-protected based on an integrity protection algorithm.

In step S71, receiving the second announcement message includes receiving the second announcement message sent by the second UE.

In an embodiment, the discovery solicitation message includes an RSC. In this way, the first UE may know the relay service indicated by the RSC requested by the second UE.

In another embodiment, the discovery solicitation message includes, but is not limited to, an RSC and an identification information of the second UE. In this way, the first UE can know which second UE needs the requested relay service indicated by the RSC.

In step S72, decrypting and verifying the second announcement message based on the discovery key, includes decrypting the second announcement message based on the discovery key and a decryption algorithm corresponding to the encryption algorithm, and performing integrity verification on the second announcement message through an integrity protection algorithm.

An embodiment of the present disclosure provides a relay communication method, which is executed by a first UE, and includes: sending a third announcement message, where the third announcement message includes a discovery response message which is encrypted based on the discovery key and subject to integrity protection, where the discovery response message is determined based on the discovery solicitation message.

Here, the discovery response message in the third announcement message may be a discovery response message encrypted based on the discovery key and the encryption algorithm and integrity-protected based on the integrity protection algorithm.

Here, if the first UE determines that the relay services that the first UE is authorized to provide include the relay service requested by the discovery solicitation message, the discovery response message sent by the first UE may be an acknowledgement response message. In some examples, if the first UE determines that the relay services the first UE is authorized to provide do not include the relay service requested by the discovery solicitation message, the first UE does not send the discovery response message.

In this way, in the embodiments of the present disclosure, the first UE may receive the discovery solicitation message sent by the second UE to be informed of the relay service requested by the second UE, and may send a corresponding discovery response message to the second UE according to the authorized relay services of the first UE, so as to inform the second UE whether the relay service requested by the second UE can be provided.

Moreover, both the discovery solicitation message and the discovery response message may be messages encrypted by a discovery key and subject to integrity protection, so that the security of the relay communication discovery between the first UE and the second UE may be improved.

In addition, when the first UE receives an announcement message sent by the second UE which is encrypted by the discovery key and subject to integrity protection, the first UE may decrypt and verify the integrity of the announcement message through the same discovery key, etc., and can accurately obtain the content of the announcement message.

It should be noted that, those skilled in the art can understand that the method provided in the embodiments of the present disclosure can be performed alone or together with some methods in the embodiments of the present disclosure or some methods in related art.

The following describes a relay communication method performed by the second UE, which is similar to the description of the relay communication method performed by the first UE described above; and for the technical details not disclosed in the embodiments of the relay communication method performed by the second UE, please refer to the description of the examples of the relay communication method executed by the first UE, and it is not described in detail here.

Figure 8:
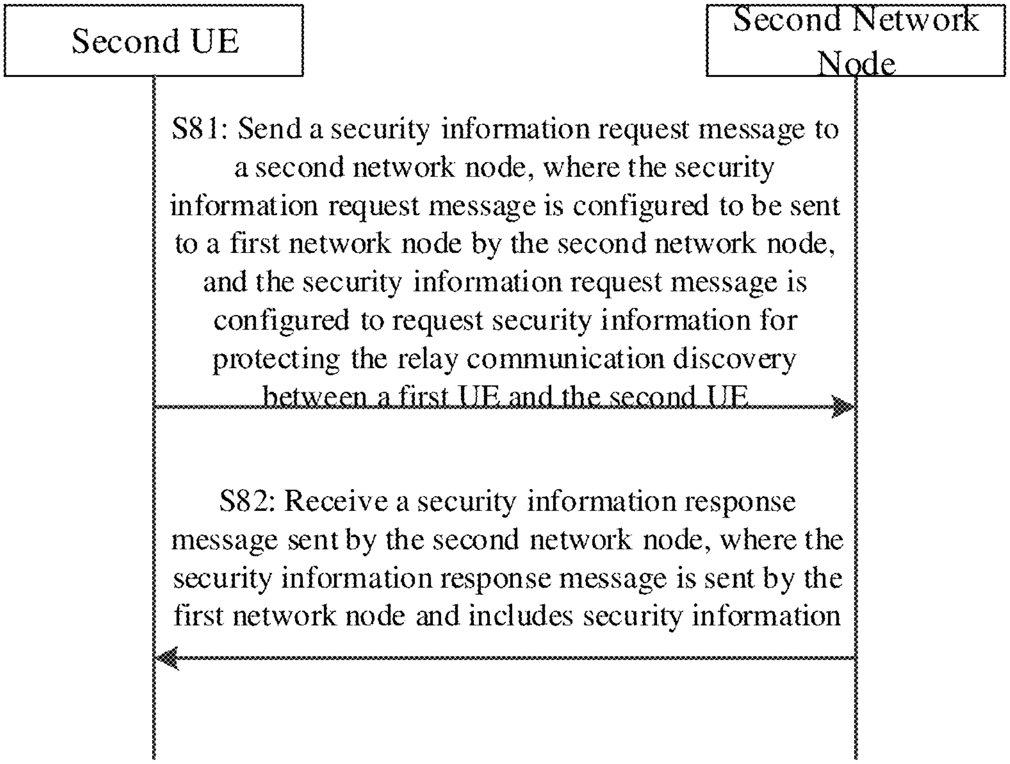
FIG. 8 is a flowchart illustrating a relay communication method according to an exemplary embodiment.

As shown in FIG. 8, an embodiment of the present disclosure provides a relay communication method, which is executed by a second UE and includes the following steps.

In step S81, a security information request message is sent to a second network node, where the security information request message is configured to be sent to a first network node by the second network node, and the security information request message is configured to request security information for protecting the relay communication discovery between a first UE and the second UE.

In step S82, a security information response message sent by the second network node is received, where the security information response message is sent by the first network node and includes security information.

In some embodiments of the present disclosure, the security information request message, the security information, and the security information response message may be respectively the same as those in the above embodiments; the key request message, the key response message and the discovery intermediate key may be respectively the same as the key request message, the key response message and the discovery intermediate key in the above embodiments.

In some embodiments, the security information request message includes a key request message; the security information response message includes a key response message; and the security information includes a discovery intermediate key.

An embodiment of the present disclosure provides a relay communication method, executed by a second UE, including:

sending a key request message to a second network node, where the key request message is configured to be sent to a first network node by the second network node, and the key request message is configured to request a discovery intermediate key for protecting the relay communication discovery between the first UE and the second UE;

receiving a key response message sent by the second network node, wherein the key response message is sent by the first network node and includes security information.

In some embodiments, the key request message includes an RSC indicating a relay service;

the key response message includes a discovery intermediate key for the RSC, or a discovery intermediate key for the RSC and identification information of the discovery intermediate key.

Here, the discovery intermediate key is different for different RSCs.

In some embodiments, the key request message includes, but is not limited to, at least one of the following:

type indication information, configured to indicate a discovery message type of the relay communication;

second security indication information, configured to indicate the security capability of the second UE.

In some embodiments, the key response message includes, but is not limited to, at least one of the following:

an algorithm identification, where the algorithm identification includes at least one of the following: a first algorithm identification, configured to indicate an algorithm for encrypting and decrypting the discovery message of the relay communication; or a second algorithm identification, configured to indicate an algorithm for performing integrity protection on the discovery message of the relay communication;

time-related information, configured to determine whether a discovery message of a relay communication is subject to replay attacks.

In some other embodiments, the key response message includes a first algorithm identification indicating encryption algorithm information and/or a second algorithm identification indicating integrity protection algorithm information.

An embodiment of the present disclosure provides a relay communication method, executed by a second UE, including:

obtaining second address information of a second network node;

sending a security information request message to the second network node based on the second address information.

In some embodiments, the sending the security information request message to the second network node in step S81 includes sending the security information request message to the second network node based on the second address information.

In some embodiments, the obtaining the second address information of the second network node includes obtaining the second address information of the second network node from a PCF or a DDNMF.

An embodiment of the present disclosure provides a relay communication method, which is executed by a second UE, and includes: obtaining second address information of a second network node from a PCF or a DDNMF.

Here, the PCF or the DDNMF is a PCF or a DDNMF corresponding to the second UE.

An embodiment of the present disclosure provides a relay communication method, which is executed by a second UE, and includes: obtaining a second RSC set, where the second RSC set includes: at least one second RSC, where the second RSC is an RSC of a relay service that can be obtained by the second UE.

In some embodiments, obtaining the second RSC set includes obtaining the second RSC set from the PCF.

An embodiment of the present disclosure provides a relay communication method, which is executed by a second UE, and includes: obtaining a second RSC set from a PCF.

Here, the second RSC set may be discovery parameters.

An embodiment of that present disclosure provides a relay communication method, executed by a second UE, including determining a discovery key based on a discovery intermediate key.

The discovery key includes at least one of the following: a DUCK and a DUIK, where the DUCK is used for encrypting and decrypting the discovery message of the relay communication, and DUIK is used for protecting the integrity of the discovery message of the relay communication.

In some embodiments, determining the discovery key based on the discovery intermediate key includes one of:

- determining a discovery key based on the discovery intermediate key and an algorithm identification;
- determining a discovery key based on the discovery intermediate key, the algorithm identification, and an RSC.

An embodiment of the present disclosure provides a relay communication method, which is executed by a second UE, and includes determining a discovery key based on a discovery intermediate key and an algorithm identification.

The embodiment of the present disclosure provides a relay communication method, which is executed by a second UE, and includes determining a discovery key based on a discovery intermediate key, an algorithm identification, and an RSC.

An embodiment of the present disclosure provides a relay communication method, executed by a second UE, including:

- receiving a first announcement message, where the first announcement message includes a discovery message encrypted based on the discovery key and subject to integrity protection, and the discovery message is configured to indicate that a first UE supports to be discovered to provide a relay service;
- decrypting and verifying the first announcement message based on the discovery key to obtain the discovery message.

An embodiment of the present disclosure provides a relay communication method, executed by a second UE, including:

- sending a second announcement message, where the second announcement message includes a discovery solicitation message encrypted based on a discovery key and subject to integrity protection; and the discovery solicitation message is used for requesting the second UE to discover a requested relay service.

An embodiment of the present disclosure provides a relay communication method, executed by a second UE, including:

- receiving a third announcement message, where the third announcement message includes a discovery response message encrypted based on a discovery key and subject to integrity protection, where the discovery response message is determined based on the discovery solicitation message;
- decrypting and verifying the third announcement message based on the discovery key to obtain a discovery response message.

In some embodiments of the present disclosure, the first announcement message, the second announcement message and the third announcement message may be respectively the same as the first announcement message, the second announcement message and the third announcement message in the above embodiments; and the discovery message, the discovery solicitation message and the discovery response message may be respectively the same as the discovery message, the discovery solicitation message and the discovery response message in the above embodiments. And, in the example of the present disclosure, the way of encrypting the message based on the discovery key and the encryption algorithm and performing integrity protection based on the integrity protection algorithm is similar to the corresponding way in the above embodiments; and the way of decrypting the message based on the discovery key and the decryption algorithm corresponding to the encryption algorithm and verifying the integrity of the message is similar to the way in the above embodiments.

The above embodiments may refer to the specific description on the first UE side, and details are not repeated here.

It should be noted that those skilled in the art can understand that the method provided in the embodiments of the present disclosure can be performed alone or together with some methods in the embodiments of the present disclosure or some methods in related art.

The following describes a relay communication method performed by a first network node, which is similar to the description of the relay communication method performed by the first UE and/or the second UE; and for the technical details not disclosed in the embodiments of the relay communication method performed by the first network node, please refer to the description of the examples of the relay communication method performed by the first UE and/or the second UE, and it will not be described in detail here.

Figure 9:
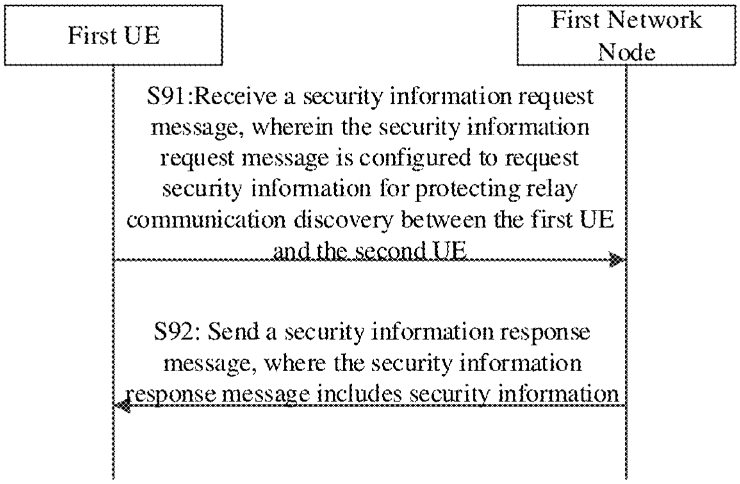
FIG. 9 is a flowchart illustrating a relay communication method according to an exemplary embodiment.

As shown in FIG. 9, an embodiment of the present disclosure provides a relay communication method, which is executed by a first network node, and includes the following steps.

In step S91, a security information request message is received, wherein the security information request message is configured to request security information for protecting relay communication discovery between the first UE and the second UE;

- in step S92, a security information response message is sent, where the security information response message includes security information.

In some embodiments of the present disclosure, the security information request message, the security information, and the security information response message may be respectively the same as those in the above embodiments; the key request message, the key response message and the discovery intermediate key may be respectively the same as the key request message, the key response message and the discovery intermediate key in the above embodiments.

In step S91, a security information request message sent by the first UE is received.

In step S92, a security information response message is sent to the first UE.

An embodiment of the present disclosure provides a relay communication method, performed by a first network node, including: determining security information based on a received security information request message.

In some embodiments, the security information request message includes a key request message; the security information response message includes a key response message; and the security information includes a discovery intermediate key.

An embodiment of the present disclosure provides a relay communication method, which is executed by a first network node and includes the following steps:

receiving a key request message, where the key request message is used for requesting a discovery intermediate key for protecting the relay communication discovery between a first UE and a second UE;

sending a key response message, where the key response message includes the discovery intermediate key.

An embodiment of that present disclosure provides a relay communication method, performed by a first network node, including determining a discovery intermediate key based on a received key request message.

In some embodiments, the key request message includes an RSC indicating a relay service;

the key response message includes a discovery intermediate key for the RSC, or a discovery intermediate key for the RSC and identification information of the discovery intermediate key.

In some embodiments, the receiving the security information request message in step S91 includes receiving a key request message sent by the first UE;

the sending the security information response message in step S92 includes sending a key response message to the first UE in response to determining that the first UE is authorized to provide the relay service.

An embodiment of the present disclosure provides a relay communication method, executed by a first network node, including determining a discovery intermediate key based on a relay service indicated by a received RSC.

In an example, the first network node receives the key request message, and determines a discovery intermediate message of a relay service indicated by the RSC based on the RSC carried in the key request message.

In some examples, the first network node may store a corresponding relationship between at least one RSC and the discovery intermediate key, and the first network node may determine the discovery intermediate key of the received RSC based on the received RSC and the corresponding relationship.

Thus, in the embodiment of the present disclosure, the first network node may accurately determine the discovery intermediate key of the relay service indicated by the RSC in various ways.

Figure 10:
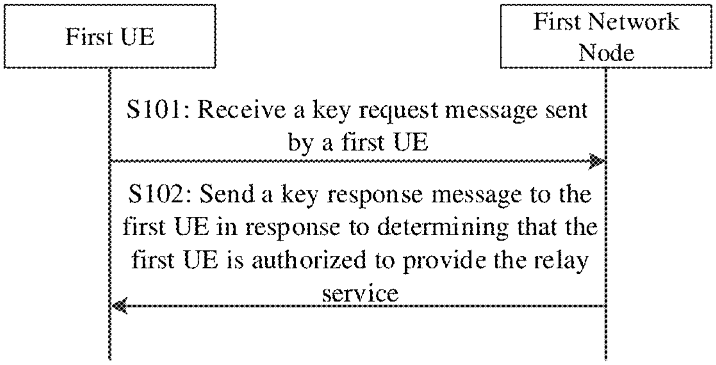
FIG. 10 is a flowchart illustrating a relay communication method according to an exemplary embodiment.

As shown in FIG. 10, an embodiment of the present disclosure provides a relay communication method, which is executed by a first network node, and includes the following steps.

In step S101, a key request message sent by a first UE is received.

In step S102, a key response message is sent to the first UE in response to determining that the first UE is authorized to provide the relay service.

In some embodiments, the receiving the security information request message in step S91 includes receiving a key request message sent by a second network node, where the key request message is sent by the second network node after determining that the second UE is authorized to discover the relay service;

The sending the security information response message in step S92 includes sending a key response message to the second network node.

An embodiment of the present disclosure provides a relay communication method, which is executed by a first network node and including:

receiving a key request message sent by a second network node, where the key request message is sent by the second network node after determining that the second UE is authorized to discover the relay service;

sending a key response message to the second network node.

In some embodiments, sending the key response message to the second network node includes: sending the key response message to the second network node in response to determining that the first UE is authorized to provide the relay service to the second UE.

An embodiment of the present disclosure provides a relay communication method, performed by a first network node, including: sending a key response message to a second network node in response to determining that a first UE is authorized to provide the relay service to a second UE.

In some embodiments, the key request message includes, but is not limited to, at least one of the following:

type indication information, configured to indicate a discovery message type of a relay communication;

first security indication information, configured to indicate a security capability of the first UE;

second security indication information, configured to indicate a security capability of the second UE.

In some embodiments, the key response message includes, but is not limited to, at least one of the following:

an algorithm identification, wherein the algorithm identification comprises at least one of the following: a first algorithm identification, configured to indicate an algorithm for encrypting and decrypting a discovery message of a relay communication; or a second algorithm identification, configured to indicate an algorithm for performing integrity protection on the discovery message of the relay communication;

time-related information, configured to determine whether a discovery message of a relay communication is subject to replay attacks.

In some other embodiments, the key response message includes a first algorithm identification indicating encryption algorithm information and/or a second algorithm identification indicating integrity protection algorithm information.

The above embodiments may refer to the specific description on the first UE side, and details are not repeated here.

It should be noted that those skilled in the art can understand that the method provided in the embodiments of the present disclosure can be performed alone or together with some methods in the embodiments of the present disclosure or some methods in related art.

The following describes a relay communication method performed by a second network node, which is similar to the description of the relay communication method performed by the first UE, the second UE, and/or the first network node; for the technical details not disclosed in the embodiments of the relay communication method performed by the second network node, please refer to the description of the examples of the relay communication method performed by the first UE, the second UE, and/or the first network node, and it will not be described in detail here.

Figure 11:
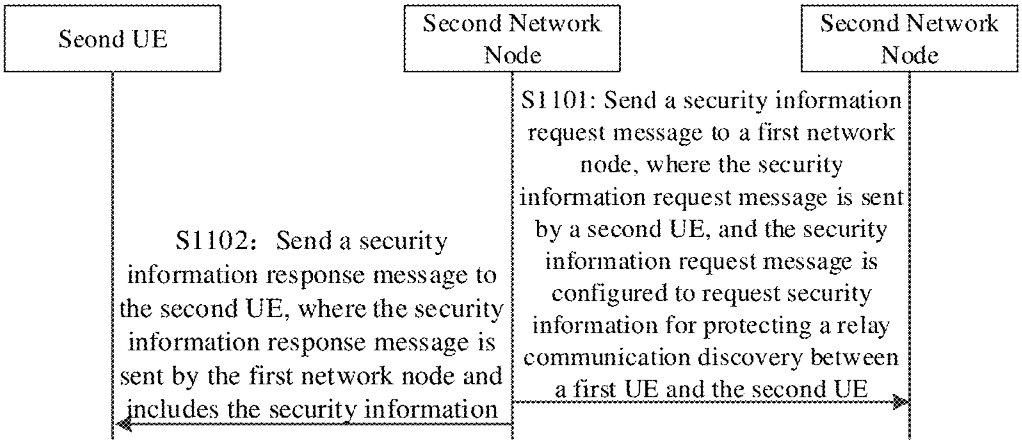
FIG. 11 is a flowchart illustrating a relay communication method according to an exemplary embodiment.

As shown in FIG. 11, an embodiment of the present disclosure provides a relay communication method, which is performed by a second network node, and includes the following steps.

In step S1101, a security information request message is sent to a first network node, where the security information request message is sent by a second UE, and the security information request message is configured to request security information for protecting a relay communication discovery between a first UE and the second UE;

in step S1102: a security information response message is sent to the second UE, where the security information response message is sent by the first network node and includes the security information.

In some embodiments of the present disclosure, the security information request message, the security information, and the security information response message may be respectively the same as those in the above embodiments; the key request message, the key response message and the discovery intermediate key may be respectively the same as the key request message, the key response message and the discovery intermediate key in the above embodiments.

In some embodiments, the security information request message includes a key request message; the security information response message includes a key response message; and the security information includes a discovery intermediate key.

An embodiment of the present disclosure provides a relay communication method, which is performed by a second network node, and includes:

- sending a key request message to a first network node, where the key request message is sent by a second UE, and the key request message is configured to request a discovery intermediate key for protecting a relay communication discovery between the first UE and the second UE;
- sending a key response message to the second UE, where the key response message is sent by the first network node and comprises the discovery intermediate key.

In some embodiments, the key request message includes an RSC indicating a relay service.

The key response message includes: the discovery intermediate key for the RSC, or the discovery intermediate key for the RSC and identification information of the discovery intermediate key.

In some embodiments, the sending the security information request message to the first network node in step S1101 includes: sending the key request message to the first network node in response to determining that the second UE is authorized to discover the relay service.

An embodiment of the present disclosure provides a relay communication method, performed by a second network node, including: sending a key request message to a first network node in response to determining that the second UE is authorized to discover the relay service.

In some embodiments, sending the key request message to the first network node includes: sending the key request message to the first network node based on first address information.

An embodiment of the present disclosure provides a relay communication method, which is performed by a second network node, and includes:

- determining first address information of the first network node corresponding to a RSC based on mapping information and the RSC indicating the relay service, where the mapping information includes a corresponding relationship between each RSC and the first address information of each first network node;
- sending the key request message to the first network node based on the first address information.

In some embodiments, the key request message includes, but is not limited to, at least one of the following:

- type indication information, configured to indicate a discovery message type of a relay communication;
- first security indication information, configured to indicate a security capability of the first UE;
- second security indication information, configured to indicate a security capability of the second UE.

In some embodiments, the key response message includes, but is not limited to, at least one of the following:

- an algorithm identification, wherein the algorithm identification comprises at least one of the following: a first algorithm identification, configured to indicate an algorithm for encrypting and decrypting a discovery message of a relay communication; or a second algorithm identification, configured to indicate an algorithm for performing integrity protection on the discovery message of the relay communication;
- time-related information, configured to determine whether the discovery message of the relay communication is subject to replay attacks.

In some other embodiments, the key response message includes: a first algorithm identification indicating encryption algorithm information and/or a second algorithm identification indicating integrity protection algorithm information.

The above embodiments may refer to the specific description at the first UE side, and details are not repeated here.

It should be noted that those skilled in the art can understand that the method provided in the embodiments of the present disclosure can be performed alone or together with some methods in the embodiments of the present disclosure or some methods in related art.

In order to further explain any of the embodiments of the present disclosure, several specific embodiments are provided in the following.

Example 1

Figure 12:
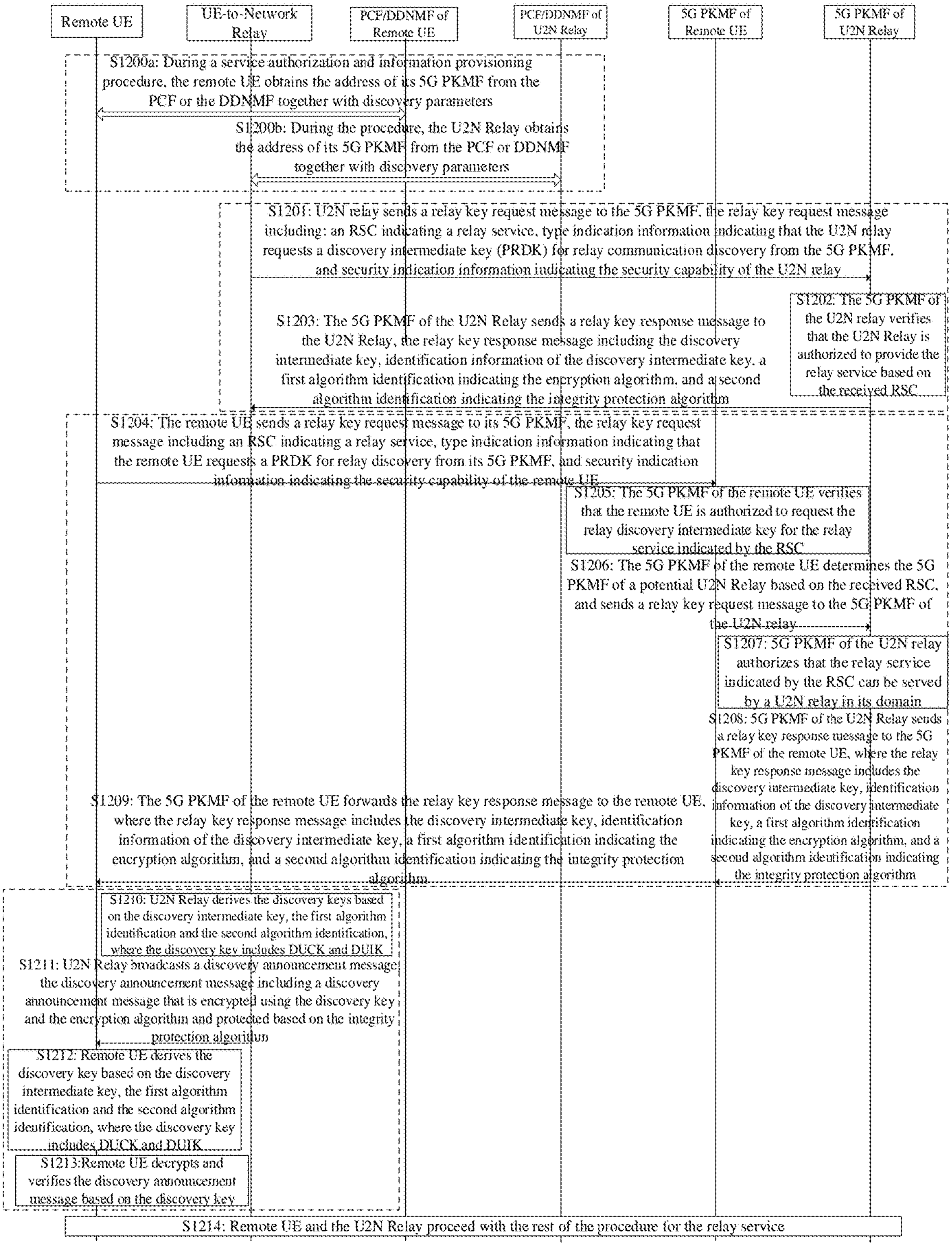
FIG. 12 is a flowchart illustrating a relay communication method according to an exemplary embodiment.

As shown in FIG. 12, an embodiment of the present disclosure provides a relay communication method, which is performed by a communication device, and the communication device includes a first UE, a second UE, a first network node, and a second network node. Here, the first UE is a U2N relay, the second UE is a remote UE, the first network node is a 5G PKMF of the U2N relay, and the second network node is a 5G PKMF of the remote UE. The relay communication method includes the following steps.

Here, the 5G PKMF of the remote UE is configured with a mapping table between RSCs and addresses of the 5G PKMF of potential U2N Relays providing the relay services indicated by the RSCs.

In step S1200*a*, during a service authorization and information provisioning procedure, the remote UE obtains, from the PCF or the DDNMF of the remote UE, the address of 5G PKMF of the remote UE together with discovery parameters.

The address of the 5G PKMF of the remote UE in step S1200*a* is the second address information in the foregoing embodiments, and the discovery parameters in step S1200*a* include at least one RSC. The discovery parameters in step S1200*a* may include the second RSC set in the above embodiments.

In step S1200*b*, during the service authorization and information provisioning procedure, the U2N Relay obtains, from the PCF or DDNMF of the U2N Relay, the address of 5G PKMF of the U2N Relay together with discovery parameters.

The address of the 5G PKMF of the remote UE in step S1200*b* is the first address information in the foregoing embodiments, and the discovery parameters in step S1200*b* include at least one RSC. The discovery parameters in step S1200*b* may include the first RSC set in the above embodiments.

In step S1201, the U2N Relay sends a relay key request message to the 5G PKMF of the U2N Relay, where the relay key request message includes: an RSC indicating a relay service, type indication information indicating that the U2N Relay requests a discovery intermediate key (PRDK) for relay communication discovery from the 5G PKMF of the U2N Relay, and security indication information indicating the security capability of the U2N Relay.

Here, the relay key request message is configured to request a discovery intermediate key for performing relay communication discovery between the remote UE and the U2N Relay.

In step S1202, based on the received RSC, the 5G PKMF of the U2N Relay verifies that the U2N Relay is authorized to provide the relay service indicated by the RSC.

In some embodiments, the 5G PKMF of the U2N Relay generates the discovery intermediate key (PRDK) and identification information (ID) of the discovery intermediate key based on the RSC; based on the security capability of the U2N Relay, the 5G PKMF of the U2N Relay determines an encryption algorithm and an integrity protection algorithm for protecting the discovery message broadcasted between the remote UE and the U2N Relay.

In step S1203, the 5G PKMF of the U2N Relay sends a relay key response message to the U2N Relay, where the relay key response message includes the discovery intermediate key, identification information of the discovery intermediate key, a first algorithm identification indicating the encryption algorithm, and a second algorithm identification indicating the integrity protection algorithm.

In some embodiments, the relay key response message includes time-related information, wherein the time-related information includes: at least one of a current time, a maximum offset, and a validity timer.

In step S1204, the remote UE sends a relay key request message to the 5G PKMF of the remote UE, where the relay key request message includes an RSC indicating a relay service, type indication information indicating that the remote UE requests a discovery intermediate key (PRDK) for relay discovery from the 5G PKMF of the remote UE, and security indication information indicating the security capability of the remote UE.

In step S1205, the 5G PKMF of the remote UE verifies that the remote UE is authorized to request the discovery intermediate key for the relay service indicated by the RSC.

In step S1206, the 5G PKMF of the remote UE locates the 5G PKMF of a potential U2N Relay based on the received RSC, and sends a relay key request message to the 5G PKMF of the U2N Relay.

In step S1207, the 5G PKMF of the U2N Relay authorizes that the relay service indicated by the received RSC can be provided by a U2N Relay in the 5G PKMF domain of the U2N Relay.

In an embodiment, the 5G PKMF of the U2N Relay generates a discovery intermediate key (PRDK) and identification information (ID) of the discovery intermediate key based on the RSC; based on the security capability of the U2N Relay, the 5G PKMF of the U2N Relay determines an encryption algorithm and an integrity protection algorithm for protecting the discovery message broadcasted between the remote UE and the U2N Relay.

In step S1208, the 5G PKMF of the U2N Relay sends a relay key response message to the 5G PKMF of the remote UE, where the relay key response message includes the discovery intermediate key, identification information of the discovery intermediate key, a first algorithm identification indicating the encryption algorithm, and a second algorithm identification indicating the integrity protection algorithm.

In an embodiment, the relay key response message includes time-related information, where the time-related information includes: at least one of a current time, a maximum offset, and a validity timer.

In step S1209, the 5G PKMF of the remote UE forwards the relay key response message to the remote UE, where the relay key response message includes the discovery intermediate key, identification information of the discovery intermediate key, a first algorithm identification indicating the encryption algorithm, and a second algorithm identification indicating the integrity protection algorithm.

In step S1210, the U2N Relay derives the discovery key based on the discovery intermediate key, the first algorithm identification and the second algorithm identification, where the discovery key includes DUCK and DUIK.

In step S1211, the U2N Relay broadcasts a discovery announcement message, where the discovery announcement message may be a discovery announcement message that is encrypted using the discovery key and the encryption algorithm and protected based on the integrity protection algorithm.

The discovery announcement message in step S1211 may be the first announcement message in the above embodiments.

In step S1212, the remote UE derives the discovery key based on the discovery intermediate key, the first algorithm identification and the second algorithm identification, where the discovery key includes DUCK and DUIK.

In step S1213, the remote UE decrypts and verifies the discovery announcement message based on the discovery key.

Here, in step S1213, the remote UE decrypts and verifies the discovery announcement message based on the discovery key, and may obtain the discovery message.

In step S1214, the remote UE and the U2N Relay proceed with the rest of the procedure for the relay service.

Example 2

Figure 13:
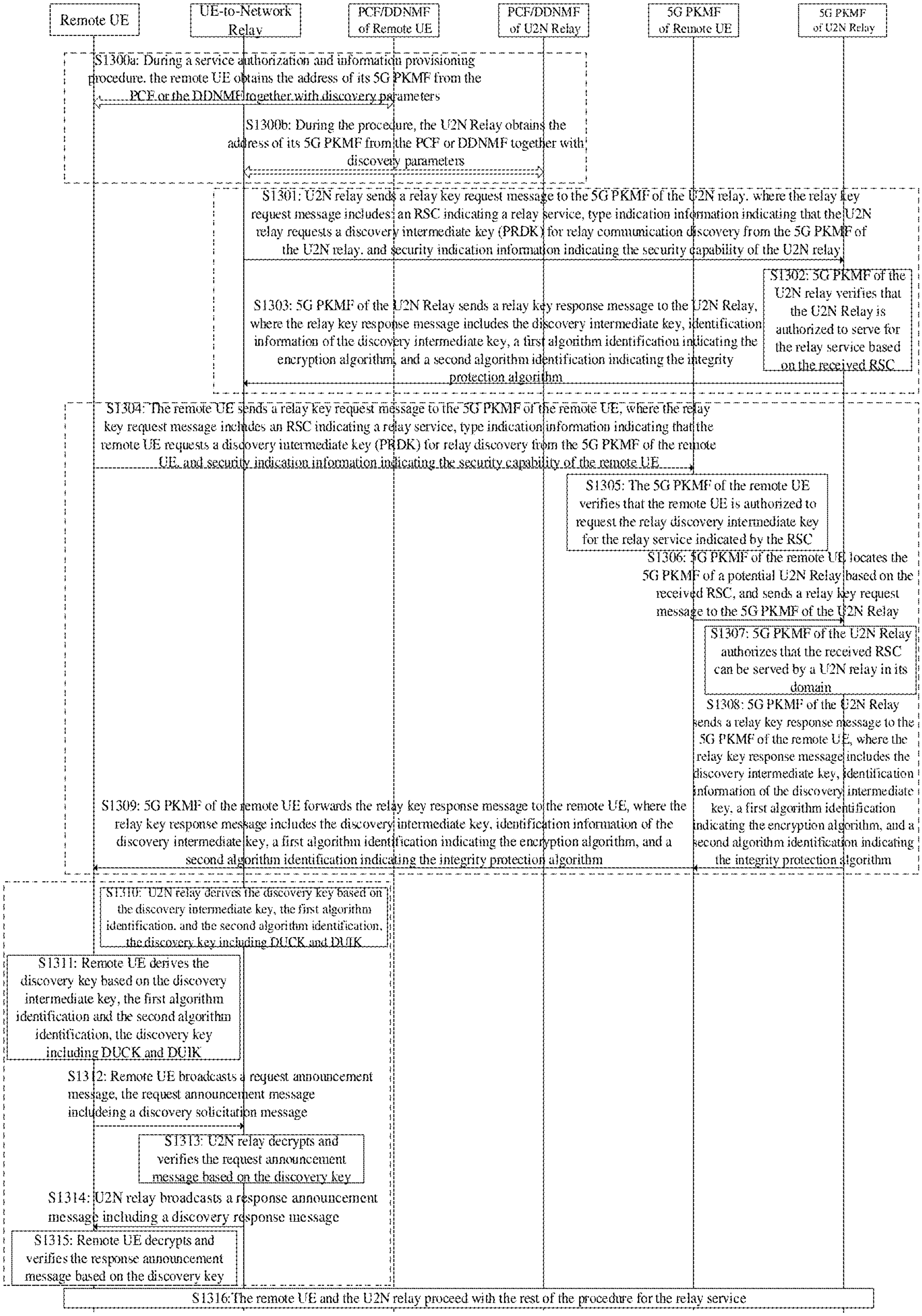
FIG. 13 is a flowchart illustrating a relay communication method according to an exemplary embodiment.

As shown in FIG. 13, an embodiment of the present disclosure provides a relay communication method, which is executed by a communication device, and the communication device includes a first UE, a second UE, a first network node, and a second network node. Here, the first UE is a U2N Relay, the second UE is a remote UE, the first network node is the 5G PKMF of the U2N Relay, and the second network node is the 5G PKMF of the remote UE. The relay communication method includes the following steps.

Here, the 5G PKMF of the remote UE is configured with a mapping table between the RSCs and the addresses of the 5G PKMF of the potential U2N Relays providing the relay services indicated by the RSCs.

Steps **S1300*a* to S1309 are the same as steps S1200*a* to S1209** in the above embodiments.

In step S1310, the U2N relay derives the discovery key based on the discovery intermediate key, the first algorithm identification, and the second algorithm identification, where the discovery key includes DUCK and DUIK.

In step S1311, the remote UE derives the discovery key based on the discovery intermediate key, the first algorithm identification and the second algorithm identification, where the discovery key includes DUCK and DUIK.

In step S1312, the remote UE broadcasts a request announcement message, where the request announcement message includes a discovery solicitation message.

The request announcement message in step S1312 is the second announcement message in the above embodiments. Here, the discovery solicitation message included in the request announcement message is encrypted using the discovery key and the encryption algorithm and is protected based on the integrity protection algorithm.

In step S1313, the U2N Relay decrypts and verifies the request announcement message based on the discovery key.

In step S1314, the U2N Relay broadcasts a response announcement message, where the response announcement message includes a discovery response message.

The response announcement message in step S1314 is the third announcement message in the above embodiments. Here, the discovery response message included in the response announcement message is encrypted using the discovery key and the encryption algorithm and is protected based on the integrity protection algorithm.

In step S1315, the remote UE decrypts and verifies the response announcement message based on the discovery key.

In step S1316, the remote UE and the U2N Relay proceed with the rest of the procedure for the relay service.

It should be noted that those skilled in the art can understand that the method provided in the embodiments of the present disclosure can be performed alone or together with some methods in the embodiments of the present disclosure or some methods in related art.

Figure 14:
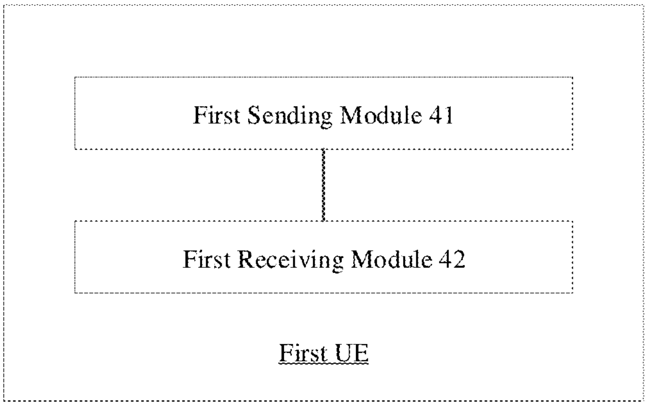
FIG. 14 is a block diagram illustrating a relay communication apparatus according to an exemplary embodiment.

As shown in FIG. 14, an embodiment of the present disclosure provides a relay communication apparatus, which is applied to a first UE, and includes:

a first sending module 41, configured to send a security information request message to a first network node, where the security information request message is used to request security information for protecting relay communication discovery between the first UE and a second UE;

a first receiving module 42, configured to receive a security information response message sent by the first network node, where the security information response message comprises the security information.

In one embodiment, the security information request message comprises a key request message; the security information response message comprises a key response message; and the security information comprises: a discovery intermediate key.

An embodiment of the present disclosure provides a relay communication apparatus, which is applied to a first UE, and includes:

a first sending module 41, configured to send a key request message to a first network node, where the key request message is configured to request a discovery intermediate key for protecting relay communication discovery between the first UE and a second UE;

a first receiving module 42, configured to receive a key response message sent by the first network node, where the key response message comprises the discovery intermediate key.

In an embodiment, the key request message includes a relay service code (RSC) indicating a relay service;

the key response message includes a discovery intermediate key for an RSC, or a discovery intermediate key for an RSC and identification information of the discovery intermediate key.

In some embodiments, the key request message includes, but is not limited to, at least one of the following:

type indication information, configured to indicate the discovery message type of the relay communication;

first security indication information, used for indicating the security capability of the first UE.

In some embodiments, the key response message includes, but is not limited to, at least one of the following:

an algorithm identification, where the algorithm identification comprises at least one of the following:

a first algorithm identification for indicating an algorithm for encrypting and decrypting a discovery message of a relay communication; or a second algorithm identification, configured to indicate an algorithm for performing integrity protection on the discovery message of the relay communication;

time-related information for determining whether the discovery message of the relay communication is subject to replay attacks.

In some embodiments, the key response message includes a first algorithm identification indicating encryption algorithm information and/or a second algorithm identification indicating integrity protection algorithm information.

An embodiment of the present disclosure provides a relay communication apparatus, which is applied to a first UE, and includes a first processing module configured to determine a discovery key based on a discovery intermediate key.

In some embodiments, the discovery key comprises at least one of:

an encryption key (DUCK) for encrypting and decrypting a discovery message of a relay communication;

an integrity assurance key (DUIK) for protecting integrity of the discovery message of the relay communication.

An embodiment of the present disclosure provides a relay communication apparatus, which is applied to a first UE, and includes a first processing module, configured to determine a discovery key based on a discovery intermediate key and an algorithm identification.

An embodiment of the present disclosure provides a relay communication apparatus, which is applied to a first UE, and includes a first processing module, configured to determine a discovery key based on a discovery intermediate key, an algorithm identification, and an RSC.

An embodiment of the present disclosure provides a relay communication apparatus, which is applied to a first UE, and comprises a first sending module 41, configured to send a first announcement message, where the first announcement message comprises a discovery message encrypted based on a discovery key and subject to integrity-protection, and the discovery message is used to indicate that the first UE supports being discovered to provide a relay service.

An embodiment of the present disclosure provides a relay communication device, which is applied to a first UE, and includes:

a first receiving module 42 configured to receive a second announcement message, where the second announcement message comprises a discovery solicitation message encrypted based on a discovery key and subject to integrity protection, and the discovery solicitation message is configured to request the second UE to discover a requested relay service;

a first processing module, configured to decrypt and verify the second announcement message based on the discovery key to obtain the discovery solicitation message.

An embodiment of the present disclosure provides a relay communication apparatus, which is applied to a first UE, and includes a first sending module 41, configured to send a third announcement message, where the third announcement message comprises a discovery response message encrypted based on a discovery key and integrity protected, where the discovery response message is determined based on a discovery solicitation message.

An embodiment of the present disclosure provides a relay communication apparatus, which is applied to a first UE and includes: an obtaining module configured to obtain first address information of a first network node;

- a first sending module 41, configured to send a security information request message to the first network node based on the first address information.

An embodiment of the present disclosure provides a relay communication apparatus, which is applied to a first UE, and includes an obtaining module configured to obtain first address information of a first network node from a PCF or a DDNMF.

An embodiment of the present disclosure provides a relay communication apparatus, which is applied to a first UE, and comprises: an obtaining module configured to obtain a first RSC set, where the first RSC set comprises at least one first RSC, and the first RSC is an RSC of a relay service that can be provided by the first UE.

An embodiment of the present disclosure provides a relay communication apparatus, which is applied to a first UE, and includes an obtaining module configured to obtain a first RSC set from a PCF.

Figure 15:
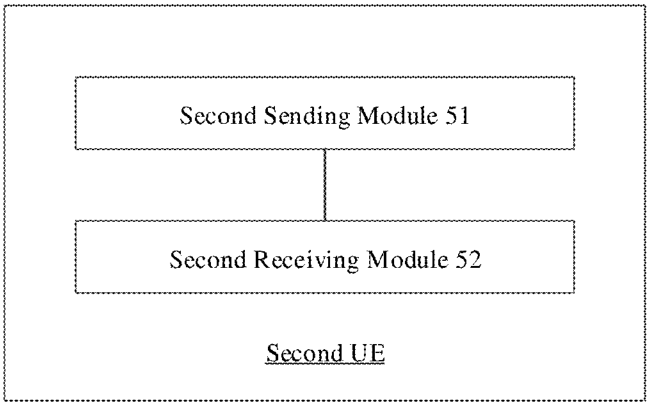
FIG. 15 is a block diagram illustrating a relay communication apparatus according to an exemplary embodiment.

As shown in FIG. 15, an embodiment of the present disclosure provides a relay communication apparatus applied to a second UE, including:

- a second sending module 51, configured to send a security information request message to a second network node, so that the security information request message is sent to a first network node by the second network node, where the security information request message is used for requesting security information for protecting a relay communication discovery between a first UE and the second UE;
- a second receiving module 52, configured to receive a security information response message sent by a second network node, where the security information response message is sent by a first network node, and the security information message comprises the security information.

In an embodiment, the security information request message comprises a key request message; the security information response message comprises a key response message; and the security information comprises: a discovery intermediate key.

In an embodiment, the key request message includes an RSC indicating a relay service;

- the key response message includes: the discovery intermediate key for the RSC, or the discovery intermediate key for the RSC and identification information of the discovery intermediate key.

In some embodiments, the key request message includes, but is not limited to, at least one of the following:

- type indication information, configured to indicate the discovery message type of the relay communication;
- second security indication information, configured to indicate the security capability of the second UE.

In some embodiments, the key response message includes, but is not limited to, at least one of the following:

- an algorithm identification, wherein the algorithm identification comprises at least one of the following:
- a first algorithm identification, configured to indicate an algorithm for encrypting and decrypting a discovery message of a relay communication; or
- a second algorithm identification, configured to indicate an algorithm for performing integrity protection on the discovery message of the relay communication;
- time-related information, configured to determine whether the discovery message of the relay communication is subject to replay attacks.

In some embodiments, the key response message includes a first algorithm identification indicating encryption algorithm information and/or a second algorithm identification indicating integrity protection algorithm information.

An embodiment of the present disclosure provides a relay communication apparatus, which is applied to a second UE, and includes a second processing module configured to determine a discovery key based on a discovery intermediate key.

In some embodiments, the discovery key includes, but is not limited to, at least one of the following:

- DUCK, configured to encrypt and decrypt the discovery message of the relay communication;
- DUIK, configured to protect the integrity of the discovery message of the relay communication.

An embodiment of the present disclosure provides a relay communication apparatus, which is applied to a second UE, and includes a second processing module configured to determine a discovery key based on a discovery intermediate key and an algorithm identification.

An embodiment of the present disclosure provides a relay communication apparatus, which is applied to a second UE, and includes a second processing module configured to determine a discovery key based on a discovery intermediate key, an algorithm identification, and an RSC.

An embodiment of the present disclosure provides a relay communication apparatus, which is applied to a second UE, and comprises a second receiving module 52, configured to receive a first announcement message, where the first announcement message comprises a discovery message encrypted based on a discovery key and subject to integrity protection, and the discovery message is used to indicate that the first UE supports being discovered to provide a relay service;

- a second processing module, configured to decrypt and verify the first announcement message based on the discovery key to obtain the discovery message.

An embodiment of the present disclosure provides a relay communication apparatus, which is applied to a second UE, and comprises: a second sending module 51, configured to send a second announcement message, wherein the second announcement message comprises a discovery solicitation message encrypted based on a discovery key and subject to integrity protection, and the discovery solicitation message is configured to request the second UE to discover a requested relay service.

An embodiment of the present disclosure provides a relay communication apparatus, which is applied to a second UE, and comprises: a second receiving module 52, configured to receive a third announcement message, wherein the third announcement message comprises a discovery response message encrypted based on a discovery key and subject to integrity-protection, where the discovery response message is determined based on a discovery solicitation message;

- a second processing module, configured to decrypt and verify the third announcement message based on the discovery key to obtain a discovery response message.

An embodiment of the present disclosure provides a relay communication apparatus, which is applied to a second UE and comprises: an obtaining module configured to obtain second address information of a second network node;

a second sending module 51, configured to send a security information request message to the second network node based on the second address information.

An embodiment of the present disclosure provides a relay communication apparatus, applied to a second UE, comprising: an obtaining module, configured to obtain second address information of a second network node from a PCF or a DDNMF.

An embodiment of the present disclosure provides a relay communication apparatus, which is applied to a second UE, and comprises: an obtaining module configured to obtain a second RSC set, wherein the second RSC set comprises at least one second RSC, and the second RSC is an RSC of a relay service that can be obtained by the second UE.

An embodiment of the present disclosure provides a relay communication apparatus, which is applied to a second UE, and includes an obtaining module configured to obtain a second RSC set from a PCF.

Figure 16:
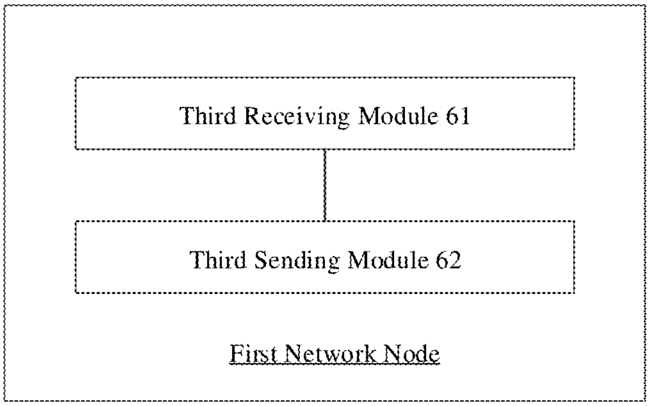
FIG. 16 is a block diagram illustrating a relay communication apparatus according to an exemplary embodiment.

As shown in FIG. 16, an embodiment of the present disclosure provides a relay communication apparatus applied to a second UE, including the following.

An embodiment of the present disclosure provides a relay communication apparatus, which is applied to a first network node, and includes:

a third receiving module 61, configured to receive a security information request message, wherein the security information request message is used to request security information for protecting a relay communication discovery of a first UE and the second UE;

a third sending module 62, configured to send a security information response message, wherein the security information response message includes the security information.

In an embodiment, the security information request message comprises a key request message; a security information response message comprises a key response message; and the security information comprises a discovery intermediate key.

In an embodiment, the key request message includes an RSC indicating a relay service;

The key response message includes the discovery intermediate key for the RSC, or the discovery intermediate key and identification information of the intermediate information key for the RSC.

An embodiment of the present disclosure provides a relay communication apparatus, which is applied to a first network node, and includes a third receiving module 61 configured to receive a key request message sent by a first UE;

a third sending module 62 configured to send a key response message to the first UE in response to determining that the first UE is authorized to provide the relay service.

An embodiment of the present disclosure provides a relay communication apparatus, which is applied to a first network node, and comprises a third receiving module 61 configured to receive a key request message sent by a second network node, wherein the key request message is sent by the second network node after determining that the second UE is authorized to discover the relay service;

a third sending module 62, configured to send a key response message to the second network node.

An embodiment of the present disclosure provides a relay communication apparatus, which is applied to a first network node, and includes a third sending module 62 configured to send a key response message to a second network node in response to determining that the first UE is authorized to provide the relay service to the second UE is authorized.

In some embodiments, the key request message includes, but is not limited to, at least one of the following:

type indication information, configured to indicate the discovery message type of the relay communication;

first security indication information, configured to indicate the security capability of the first UE;

second security indication information, configured to indicate the security capability of the second UE.

In some embodiments, the key response message includes, but is not limited to, at least one of the following:

an algorithm identification, wherein the algorithm identification comprises at least one of the following:

a first algorithm identification configured to indicate an algorithm for encrypting and decrypting the discovery message of the relay communication;

a second algorithm identification, configured to indicate an algorithm for performing integrity protection on the discovery message of the relay communication;

time-related information, configured to determine whether the discovery message of the relay communication is subject to replay attacks.

In some embodiments, the key response message includes a first algorithm identification indicating encryption algorithm information and/or a second algorithm identification indicating integrity protection algorithm information.

Figure 17:
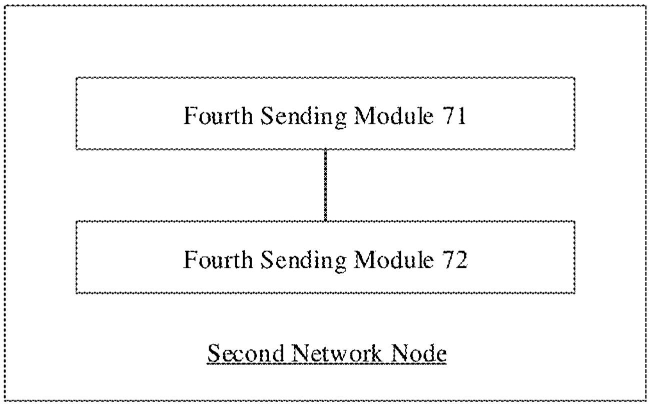
FIG. 17 is a block diagram illustrating a relay communication apparatus according to an exemplary embodiment.

As shown in FIG. 17, an embodiment of the present disclosure provides a relay communication apparatus, which is applied to a second network node and includes:

a fourth sending module 71, configured to send a security information request message to a first network node, where the security information request message is sent by a second UE, and the security information request message is used to request security information for protecting a relay communication discovery between the first UE and the second UE;

a fourth sending module 72, configured to send a security information response message to the second UE, where the security information response message is sent by the first network node, and the security information message includes the security information.

In an embodiment, the security information request message comprises a key request message; the security information response message comprises a key response message; and the security information comprises a discovery intermediate key.

In an embodiment, the key request message includes an RSC indicating a relay service;

the key response message includes the discovery intermediate key for the RSC, or the discovery intermediate key for the RSC and identification information of the discovery intermediate key.

An embodiment of the present disclosure provides a relay communication apparatus, which is applied to a second network node, and includes:

a fourth sending module 71, configured to send a key request message to the first network node in response to determining that the second UE is authorized to discover the relay service.

An embodiment of the present disclosure provides a relay communication apparatus, which is applied to a second network node, and includes:

a third processing module, configured to determine first address information of a first network node corresponding to the RSC based on the mapping information and the RSC indicating the relay service, wherein the mapping information comprises a corresponding relationship between each RSC and the first address information of each first network node;

a fourth sending module 72, configured to send a key request message to the first network node based on the first address information.

In some embodiments, the key request message includes, but is not limited to, at least one of the following:

type indication information, configured to indicate the type of the discovery message of the relay communication;

first security indication information, configured to indicate a security capability of the first UE;

second security indication information, configured to indicate a security capability of the second UE.

In some embodiments, the key response message includes, but is not limited to, at least one of the following:

an algorithm identification, where the algorithm identification comprises at least one of the following:

a first algorithm identification, configured to indicate an algorithm for encrypting and decrypting the discovery message of the relay communication;

a second algorithm identification, configured to indicate an algorithm for performing integrity protection on the discovery message of the relay communication;

time-related information for determining whether a discovery message of a relay communication is subject to replay attacks.

It should be noted that those skilled in the art can understand that the apparatus provided in the embodiments of the present disclosure can be implemented independently, or can be implemented together with some apparatuses in the embodiments of the present disclosure or some apparatuses in related art.

With regard to the apparatuses in the above embodiments, the specific manners in which each module performs operations has been described in detail in the embodiments of the method, and will not be described in detail here.

An embodiment of the present disclosure provides a communication device, including:

a processor;

a memory for storing processor-executable instructions;

where the processor is configured to perform the relay communication method of any of the embodiments of the present disclosure when executing the executable instructions.

In an embodiment, the communication device may include, but is not limited to, at least one of: a core network device, an access network device, and a UE. The UE may be the first UE or the second UE in the above embodiments, and the core network device may be the RKMF in the above embodiments.

The processor may include various types of storage medium that are non-transitory computer storage medium capable of continuing keeping information stored thereon after the user device is powered off.

The processor may be coupled to the memory via a bus or the like for reading an executable program stored on the memory, for example, as at least one of the methods shown in FIGS. 4-13.

An embodiment of the present disclosure further provides a computer storage medium, storing a computer executable program, and the relay communication method of any embodiments of the present disclosure is performed when the executable program is executed by a processor, for example, as at least one of the methods shown in FIGS. 4-13.

With regard to the device or the storage medium in the above embodiments, the specific manner in which each module performs operations has been described in detail in the embodiments related to the method, and will not be described in detail here.

Figure 18:
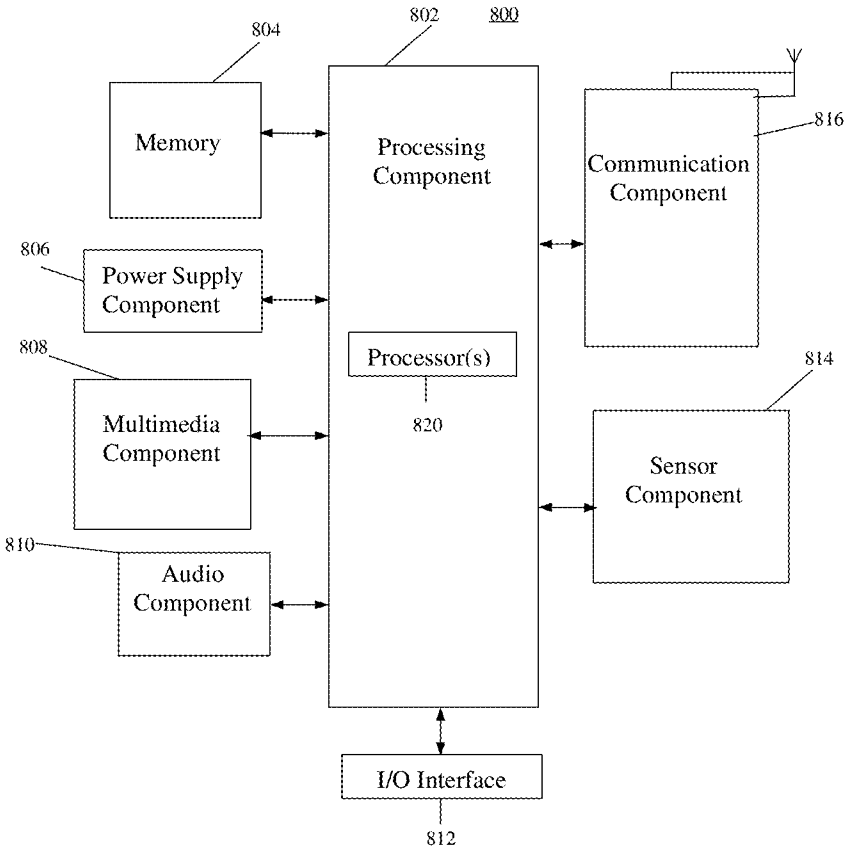
FIG. 18 is a block diagram illustrating a UE according to an exemplary embodiment.

FIG. 18 is a block diagram illustrating a user equipment 800 according to an embodiment of the present disclosure. For example, the user device 800 may be a mobile phone, a computer, a digital broadcast user device, a messaging device, a game console, a tablet device, a medical device, a fitness device, a personal digital assistant, or the like.

Referring to FIG. 18, the user equipment 800 may include one or more of a processing component 802, a memory 804, a power supply component 806, a multimedia component 808, an audio component 810, an input/output (I/O) interface 812, a sensor component 814, and a communication component 816.

The processing component 802 generally controls the overall operation of the user equipment 800, such as operations associated with displaying, phone calls, data communications, camera operations, and recording operations. The processing component 802 may include one or more processors 820 to execute instructions to perform all or some of the steps of the methods described above. In addition, the processing component 802 may include one or more modules that facilitate interactions between the processing component 802 and other components. For example, the processing component 802 may include a multimedia module to facilitate interactions between the multimedia component 808 and the processing component 802.

The memory 804 is configured to store various types of data to support operations at the user equipment 800. Examples of such data include instructions for any application or method operating on the user equipment 800, contact data, phonebook data, messages, pictures, videos, etc. The memory 804 may be implemented by any type of volatile or non-volatile memory device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 806 provides power to the various components of the user equipment 800. Power supply component 806 may include a power supply management system, one or more power supplies, and other components associated with generating, managing, and distributing power for user equipment 800.

The multimedia component 808 includes a screen providing an output interface between the user device 800 and the user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touches, swipes, and gestures on the touch panel. The touch sensor may not only sense a boundary of a touch or swipe operation, but also detect a duration and a pressure associated with the touch or swipe operation. In some embodiments, the multimedia component 808 includes a front camera and/or a rear camera. When the user equipment 800 is in an operational mode, such as a shooting mode or a video mode, the front camera and/or the rear camera may receive external multimedia data. Each front camera and rear camera may be a fixed optical lens system or have focal length and optical zoom capabilities.

The audio component 810 is configured to output and/or input audio signals. For example, the audio component 810 includes a microphone (MIC) that is configured to receive external audio signals when the user equipment 800 is in an operational mode, such as a call mode, a recording mode, and a voice recognition mode. The received audio signals may be further stored in the memory 804 or transmitted via the communication component 816. In some embodiments, the audio component 810 further includes a speaker for outputting audio signals.

The I/O interface 812 provides an interface between the processing component 802 and a peripheral interface module, the peripheral interface module may be a keyboard, a click wheel, a button, etc. These buttons may include, but are not limited to: a home button, a volume button, a launch button, and a lock button.

The sensor component 814 includes one or more sensors for providing a status assessment of various aspects of the user equipment 800. For example, the sensor component 814 may detect an on/off status of the user equipment 800, relative positioning of the components, such as a display and a keypad of the user equipment 800. The sensor component 814 may further detect a change in position of the user equipment 800 or a component of the user equipment 800, a presence or absence of user contact with the user equipment 800, The orientation or acceleration/deceleration of the user equipment 800 and the temperature change of the user equipment 800. The sensor component 814 may include a proximity sensor configured to detect the presence of a nearby object without any physical contact. The sensor component 814 may further include a light sensor, such as a CMOS or CCD image sensor, for use in imaging applications. In some embodiments, the sensor component 814 may further include an acceleration sensor, a gyro sensor, a magnetic sensor, a pressure sensor, or a temperature sensor.

Communication component 816 is configured to facilitate wired or wireless communications between the user equipment 800 and other devices. The user equipment 800 may access a wireless network based on a communication standard, such as WiFi, 4G or 5G, or a combination thereof. In an exemplary embodiment, the communication component 816 receives a broadcast signal or broadcast associated information from an external broadcast management system via a broadcast channel. In an exemplary embodiment, the communication component 816 further includes a near field communication (NFC) module to facilitate short-range communication. For example, the NFC module may be implemented based on Radio Frequency Identification (RFID) technology, Infrared Data Association (IrDA) technology, Ultra Wideband (UWB) technology, Bluetooth (BT) technology and other technologies.

In an example embodiment, the user equipment 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the methods described above.

In an exemplary embodiment, there is also provided a non-transitory computer-readable storage medium including instructions, such as memory 804 including instructions, that are executable by the one or more processors 820 of the user equipment 800 to perform the method described above. For example, the non-transitory computer readable storage medium may be a ROM, a random access memory (RAM), a CD-ROM, a magnetic tape, a floppy disk and an optical data storage device, etc.

Figure 19:
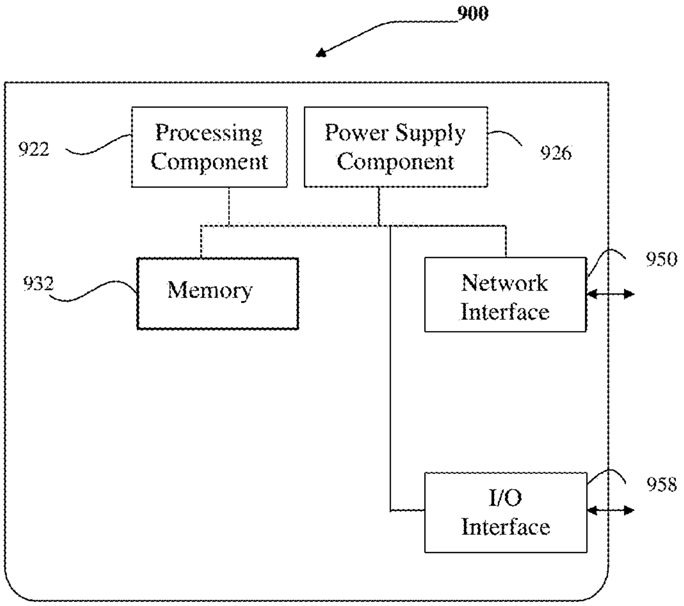
FIG. 19 is a block diagram illustrating a base station according to an exemplary embodiment.

As shown in FIG. 19, an embodiment of the present disclosure illustrates a structure of a base station. For example, a base station 900 may be provided as a network-side device. Referring to FIG. 19, the base station 900 includes a processing component 922, which further includes one or more processors, and memory resources, represented by a memory 932, for storing instructions, such as application programs that are executable by the processing component 922. An application stored in the memory 932 may include one or more modules that each corresponds to a set of instructions. Additionally, the processing component 922 is configured to execute the instructions to perform any of the aforementioned methods as applied to the base station, e.g., methods as shown in FIGS. 4-10.

The base station 900 may also include a power supply component 926 configured to perform power supply management of the base station 900, a wired or wireless network interface 950 configured to connect the base station 900 to a network, and an input-output (I/O) interface 958. The base station 900 may operate based on an operating system stored in a memory 932, such as Windows Server™, Mac OS X™, Unix, Linux, FreeBSD, or the like.

The technical solution provided in the embodiments of the present disclosure may include the following beneficial effects.

In the embodiments of the present disclosure, a security information request message may be sent to a first network node by a first UE, where the security information request message is used to request security information for protecting a relay communication discovery between the first UE and a second UE; and a security information response message sent by the first network node is received, where the security information response message includes the security information. In this way, when the first UE and the second UE perform a relay communication discovery, the security information can be used for security protection, and compared with a mode in which security protection cannot be performed when the relay communication discovery is performed, the relay communication discovery between the first UE and the second UE can be made more secure, and further, the communication between the first user equipment and a network can also be made more secure.

Other embodiments of the invention will occur to those skilled in the art upon consideration of the specification and practice of the invention disclosed herein. This disclosure is intended to cover any variations, uses, or adaptations of the invention following the general principles of the invention and including common general knowledge or customary technical means in the art not disclosed in this disclosure. It is intended that the specification and examples be considered as exemplary only, with a true scope and spirit of the invention being indicated by the following claims.

It is to be understood that the invention is not limited to the precise constructions which have been described above and illustrated in the accompanying drawings and that various modifications and changes may be made therein without departing from the scope thereof. The scope of the present invention is limited only by the appended claims.

The invention claimed is:

1. A relay communication method, performed by a first user equipment (UE), and comprising:

before a relay communication discovery between the first UE and a second UE:

sending a security information request message to a first network node, wherein the security information request message is configured to request security information for protecting the relay communication discovery between the first UE and the second UE; and receiving a security information response message sent by the first network node, wherein the security information response message comprises the security information;

wherein the security information request message comprises a key request message; the security information response message comprises a key response message, and the security information comprises a discovery intermediate key;

wherein the key request message comprises a relay service code (RSC) indicating a relay service;

the key response message comprises the discovery intermediate key for the RSC, and/or the key request message further comprises at least one of:

type indication information, configured to indicate a discovery message type of a relay communication;

first security indication information, configured to indicate security capability of the first UE, and/or the key response message further comprises at least one of:

an algorithm identification, wherein the algorithm identification comprises at least one of:

a first algorithm identification, configured to indicate an algorithm for encrypting and decrypting a discovery message of a relay communication; or a second algorithm identification, configured to indicate an algorithm for performing integrity protection on the discovery message of the relay communication;

time-related information, configured to determine whether the discovery message of the relay communication is subject to replay attacks.

2. The method of claim 1, further comprising:

determining a discovery key based on the discovery intermediate key, wherein the discovery key comprises at least one of:

an encryption key DUCK, configured to encrypt and decrypt a discovery message of a relay communication; or an integrity assurance key DUIK, configured to protect integrity of the discovery message of the relay communication;

wherein the determining the discovery key based on the discovery intermediate key comprises one of:

determining the discovery key based on the discovery intermediate key and an algorithm identification; or determining the discovery key based on the discovery intermediate key, the algorithm identification, and the RSC.

3. The method of claim 2, further comprising at least one of:

sending a first announcement message, wherein the first announcement message comprises the discovery message encrypted based on the discovery key and subject to integrity protection, and the discovery message is configured to indicate that the first UE supports being discovered to provide a relay service; or receiving a second announcement message, wherein the second announcement message comprises a discovery solicitation message encrypted based on the discovery key and subject to integrity protection; and the discovery solicitation message is configured to request the second UE to discover a requested relay service; and decrypting and verifying the second announcement message based on the discovery key to obtain the discovery solicitation message.

4. The method of claim 3, further comprising:

sending a third announcement message, wherein the third announcement message comprises a discovery response message encrypted based on the discovery key and subject to integrity protection, wherein the discovery response message is determined based on the discovery solicitation message.

5. The method of claim 1, further comprising:

obtaining first address information of the first network node;

the sending the security information request message to the first network node comprises:

sending the security information request message to the first network node based on the first address information;

wherein the obtaining the first address information of the first network node comprises:

obtaining the first address information of the first network node from a policy control function (PCF) or a direct discovery name management function (DDNMF).

6. The method of claim 1, further comprising:

obtaining a first RSC set, wherein the first RSC set comprises: at least one first RSC, and the first RSC is an RSC of a relay service which is able to be provided by the first UE;

wherein the obtaining the first RSC set comprises:

obtaining the first RSC set from the PCF.

7. A relay communication method, performed by a second user equipment (UE), and comprising:

before a relay communication discovery between a first UE and the second UE:

sending a security information request message to a second network node so that the security information request message is sent to a first network node by the second network node, wherein the security information request message is configured to request security information for protecting the relay communication discovery between the first UE and the second UE; and receiving a security information response message sent by the second network node, wherein the security information response message is sent by the first network node and comprises the security information;

wherein the security information request message comprises: a key request message; the security information response message comprises: a key response message; and the security information comprises: a discovery intermediate key;

wherein the key request message comprises: a relay service code (RSC) indicating a relay service;

the key response message comprises the discovery intermediate key for the RSC; and/or the key request message further comprises second security indication information, configured to indicate security capability of the second UE, and/or the key response message comprises at least one of:

an algorithm identification, wherein the algorithm identification comprises at least one of: a first algorithm identification, configured to indicate an algorithm for encrypting and decrypting a discovery message of a relay communication; or a second algorithm identification, configured to indicate an algorithm for performing integrity protection on the discovery message of the relay communication;

time-related information, configured to determine whether the discovery message of the relay communication is subject to replay attacks.

8. The method of claim 7, further comprising:

determining a discovery key based on the discovery intermediate key, wherein the discovery key comprises at least one of:

an encryption key DUCK, configured to encrypt and decrypt a discovery message of a relay communication; or an integrity assurance key DUIK, configured to protect integrity of the discovery message of the relay communication;

wherein the determining the discovery key based on the discovery intermediate key comprises one of:

determining the discovery key based on the discovery intermediate key and an algorithm identification; or determining the discovery key based on the discovery intermediate key, the algorithm identification, and the RSC.

9. The method of claim 8, further comprising at least one of:

receiving a first announcement message, wherein the first announcement message comprises the discovery message encrypted based on the discovery key and subject to integrity protection, and the discovery message is configured to indicate that the first UE supports being discovered to provide a relay service; and decrypting and verifying the first announcement message based on the discovery key to obtain the discovery message; or sending a second announcement message, wherein the second announcement message comprises a discovery solicitation message encrypted based on the discovery key and subject to integrity protection, and the discovery solicitation message is configured to request the second UE to discover a requested relay service.

10. The method of claim 9, further comprising:

receiving a third announcement message, wherein the third announcement message comprises a discovery response message encrypted based on the discovery key and subject to integrity protection, wherein the discovery response message is determined based on the discovery solicitation message; and decrypting and verifying the third announcement message based on the discovery key to obtain the discovery response message.

11. The method of claim 7, further comprising:

obtaining second address information of the second network node;

the sending the security information request message to the second network node comprises:

sending the security information request message to the second network node based on the second address information;

wherein the obtaining the second address information of the second network node comprises:

obtaining the second address information of the second network node from a policy control function (PCF) or a direct discovery service name management function (DDNMF).

12. The method of claim 7, further comprising:

obtaining a second RSC set, wherein the second RSC set comprises: at least one second RSC, and the second RSC is an RSC of a relay service which is able to be obtained by the second UE;

wherein the obtaining the second RSC set comprises:

obtaining the second RSC set from the PCF.

13. A relay communication method, performed by a first network node, and comprising:

before a relay communication discovery between a first user equipment (UE) and a second UE:

receiving a security information request message, wherein the security information request message is configured to request security information for protecting the relay communication discovery between the first UE and the second UE; and sending a security information response message, wherein the security information response message comprises the security information;

wherein the security information request message comprises: a key request message; the security information response message comprises: a key response message; and the security information comprises: a discovery intermediate key;

wherein the key request message comprises: a relay service code (RSC) indicating a relay service, the key response message comprises the discovery intermediate key for the RSC, wherein the receiving the security information request message comprises:

receiving the key request message sent by the first UE;

the sending the security information response message comprises:

sending the key response message to the first UE in response to determining that the first UE is authorized to provide the relay service, and/or the receiving the security request information message comprises:

receiving the key request message sent by a second network node, wherein the key request message is sent after the second network node determines that the second UE is authorized to discover the relay service;

the sending the security information response message comprises:

sending the key response message to the second network node, wherein the sending the key response message to the second network node comprises:

sending the key response message to the second network node in response to determining that the first UE is authorized to provide the relay service to the second UE, and/or the key request message further comprises at least one of:

type indication information, configured to indicate a discovery message type of a relay communication;

first security indication information, configured to indicate security capability of the first UE; or second security indication information, configured to indicate security capability of the second UE, and/or the key response message comprises at least one of:

an algorithm identification, wherein the algorithm identification comprises at least one of: a first algorithm identification, configured to indicate an algorithm for encrypting and decrypting a discovery message of a relay communication; or a second algorithm identification, configured to indicate an algorithm for performing integrity protection on the discovery message of the relay communication; or time-related information, configured to determine whether the discovery message of the relay communication is subject to replay attacks.

14. A communication device, comprises:

a processor; and a non-transitory memory for storing instructions executable by the processor;

wherein the processor is configured to perform the relay communication method according to claim 1 when executing the executable instructions.

15. A non-transitory computer storage medium, wherein the computer storage medium stores a computer-executable program that, when executed by a processor, causes the processor to perform the relay communication method according to claim 1.

* * * * *